(12) United States Patent
Andoh et al.

(10) Patent No.: US 10,118,781 B2
(45) Date of Patent: Nov. 6, 2018

(54) SHEET CONVEYING DEVICE, IMAGE READING DEVICE, AND IMAGE FORMING APPARATUS

(71) Applicants: Takayuki Andoh, Kanagawa (JP); Munekazu Hirata, Kanagawa (JP); Naoto Kitamura, Kanagawa (JP); Koji Hatayama, Kanagawa (JP); Kaoru Tada, Kanagawa (JP); Yasunobu Youda, Kanagawa (JP)

(72) Inventors: Takayuki Andoh, Kanagawa (JP); Munekazu Hirata, Kanagawa (JP); Naoto Kitamura, Kanagawa (JP); Koji Hatayama, Kanagawa (JP); Kaoru Tada, Kanagawa (JP); Yasunobu Youda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/717,862

(22) Filed: Sep. 27, 2017

(65) Prior Publication Data

US 2018/0086579 A1    Mar. 29, 2018

(30) Foreign Application Priority Data

Sep. 29, 2016  (JP) ................................ 2016-190720

(51) Int. Cl.
*B65H 7/12* (2006.01)
*B65H 5/06* (2006.01)
(Continued)

(52) U.S. Cl.
CPC ............... *B65H 5/062* (2013.01); *B65H 7/12* (2013.01); *B65H 7/125* (2013.01); *B65H 7/18* (2013.01);
(Continued)

(58) Field of Classification Search
CPC .... B65H 7/12; B65H 7/125; B65H 2511/524; B65H 7/18; G03G 2215/00548; G03G 2215/00552
See application file for complete search history.

(56) References Cited

U.S. PATENT DOCUMENTS 7,819,400 B2 * 10/2010  Miyoshii .................. B65H 7/12
                                                                    271/262
8,882,107 B2 * 11/2014  Tojo ....................... B65H 9/006
                                                                    271/262

(Continued)

FOREIGN PATENT DOCUMENTS

BR        2011-111317     6/2011
JP          4-072250      3/1992
(Continued)

*Primary Examiner* — Luis A Gonzalez
(74) *Attorney, Agent, or Firm* — Duft & Bornsen, PC

(57) ABSTRACT

A sheet conveying device includes a sheet container, a separation feeder, a plurality of conveyance drivers, a multifeed detector, a sheet detector, and a conveyance controller. The conveyance drivers are driven to convey a sheet to a conveyance completion position on a sheet conveyance path. The multifeed detector detects occurrence of a multifeed on the conveyance path. The sheet detector detects presence or absence of the sheet at a sheet detection point on the conveyance path. The conveyance controller controls the conveyance drivers to be continuously driven until a preceding sheet preceding multifed sheets is conveyed to the conveyance completion position after the multifeed detector detects the occurrence of the multifeed. The conveyance controller controls the conveyance drivers to stop in a period in which at least one of the multifed sheets is present at the sheet detection point after the preceding sheet is conveyed to the conveyance completion position.

6 Claims, 13 Drawing Sheets

(51) Int. Cl.
*H04N 1/00* (2006.01)
*B65H 7/18* (2006.01)

(52) U.S. Cl.
CPC . *H04N 1/0032* (2013.01); *B65H 2301/44318* (2013.01); *B65H 2404/14* (2013.01); *B65H 2801/03* (2013.01); *G03G 2215/00548* (2013.01); *G03G 2215/00552* (2013.01); *H04N 1/00602* (2013.01); *H04N 1/00628* (2013.01); *H04N 2201/0081* (2013.01)

(56) References Cited

U.S. PATENT DOCUMENTS

| | | |
|---|---|---|
| 2016/0127590 A1 | 5/2016 | Hatayama et al. |
| 2016/0277624 A1 | 9/2016 | Osanai et al. |
| 2016/0360073 A1 | 12/2016 | Hatayama et al. |
| 2016/0368728 A1 | 12/2016 | Hirata et al. |
| 2017/0134598 A1 | 5/2017 | Nagano et al. |
| 2017/0142265 A1 | 5/2017 | Horikawa et al. |
| 2017/0142271 A1 | 5/2017 | Kawai et al. |
| 2017/0183181 A1 | 6/2017 | Tada et al. |
| 2017/0180603 A1 | 8/2017 | Hatayama et al. |

FOREIGN PATENT DOCUMENTS

| | | | |
|---|---|---|---|
| JP | 7-215537 | | 8/1995 |
| JP | 9-142699 | | 6/1997 |
| JP | 2007-223688 | | 9/2007 |
| JP | 2007228184 A | * | 9/2007 |
| JP | 2007-266767 | | 10/2007 |
| JP | 2008-120493 | | 5/2008 |
| JP | 2009040577 A | * | 2/2009 |
| JP | 2010-001137 | | 1/2010 |
| JP | 2010-008477 | | 1/2010 |
| JP | 2010-136274 | | 6/2010 |
| JP | 2011068448 A | * | 4/2011 |
| JP | 2013-082539 | | 5/2013 |
| JP | 2013-173620 | | 9/2013 |
| JP | 2013-258641 | | 12/2013 |
| JP | 2014-080261 | | 5/2014 |
| JP | 2014-084184 | | 5/2014 |

* cited by examiner

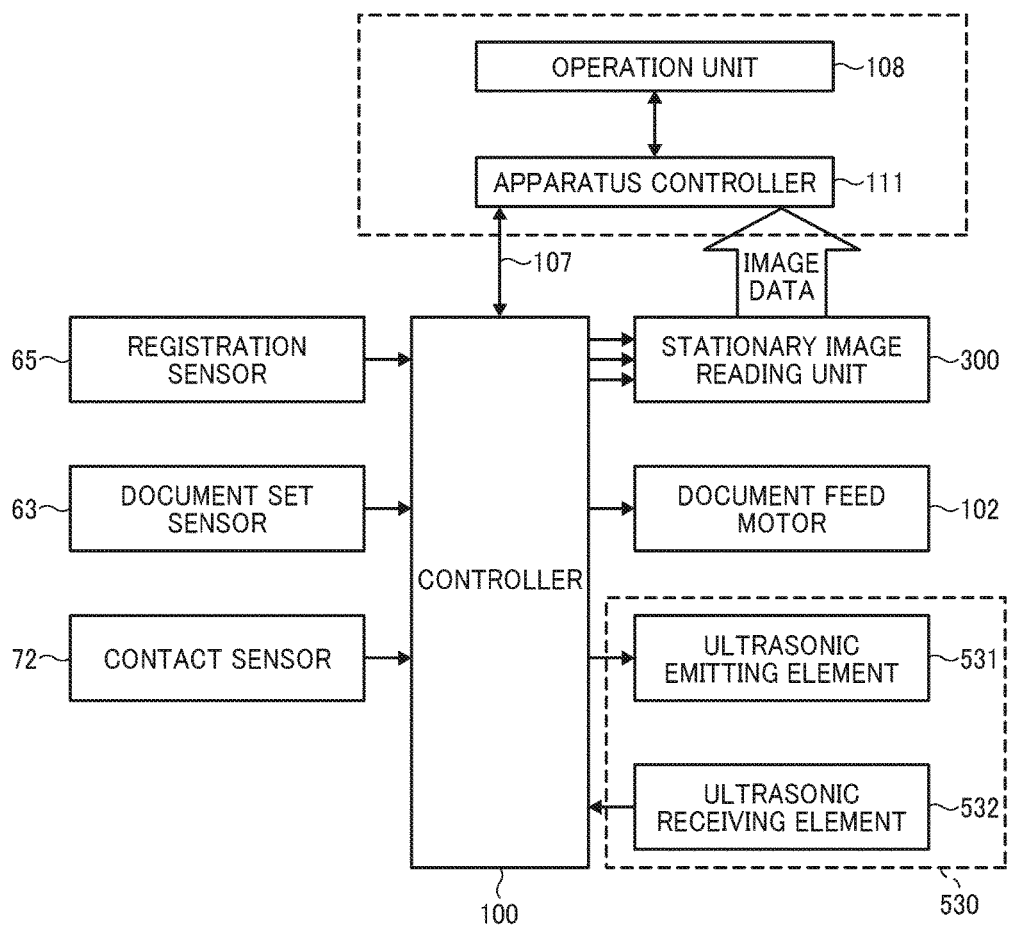
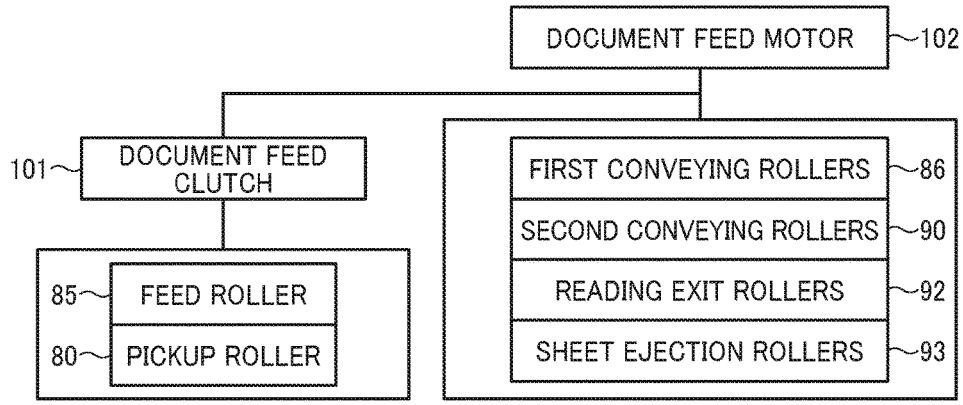

SHEET CONVEYING DEVICE, IMAGE READING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2016-190720, filed on Sep. 29, 2016, in the Japan Patent Office, the entire disclosure of which is hereby incorporated by reference herein.

BACKGROUND

Technical Field

Aspects of the present disclosure relate to a sheet conveying device, an image reading device, and an image forming apparatus.

Related Art

A sheet conveying device includes, for example, a separation feeder to separate and feed a sheet from a sheet container and two or more conveyance drivers to simultaneously drive to convey the sheet to a predetermined conveyance completion position. The sheet conveying device may further include a multifeed detector to detect occurrence of multifeed.

SUMMARY

In an aspect of the present disclosure, there is provided a sheet conveying device that includes a sheet container, a separation feeder, a plurality of conveyance drivers, a multifeed detector, a sheet detector, and a conveyance controller. The sheet container load sheets. The separation feeder separates and feeds a sheet from the sheets on the sheet container. The plurality of conveyance drivers is driven together to convey the sheet to a conveyance completion position on a sheet conveyance path. The multifeed detector detects occurrence of a multifeed on the sheet conveyance path. The sheet detector detects presence or absence of the sheet at a sheet detection point on the sheet conveyance path. The conveyance controller controls the plurality of conveyance drivers to be continuously driven until a preceding sheet preceding multifed sheets is conveyed to the conveyance completion position after the multifeed detector detects the occurrence of the multifeed. The conveyance controller controls the plurality of conveyance drivers to stop in a period in which at least one of the multifed sheets is present at the sheet detection point after the preceding sheet is conveyed to the conveyance completion position.

In another aspect of the present disclosure, there is provided a sheet conveying device that includes a sheet container, a separation feeder, a multifeed detector, a sheet detector, and a multifeed detection controller. The sheet container loads sheets. The separation feeder separates and feeds a sheet from the sheets on the sheet container to a sheet conveyance path. The multifeed detector detects occurrence of a multifeed on the sheet conveyance path. The sheet detector detects presence or absence of the sheet at a sheet detection point on the sheet conveyance path. The multifeed detection controller determines a multifeed detection period of the sheet according to a length of the sheet in a sheet conveyance direction obtained from a detection result of the sheet detector and control the multifeed detector to detect the occurrence of the multifeed in the multifeed detection period.

In still another aspect of the present disclosure, there is provided an image reading device that includes the sheet conveying device according to any one of the above-described aspects to convey the sheet and an image reader to read an image on the sheet conveyed by the sheet conveying device.

In still another aspect of the present disclosure, there is provided an image forming apparatus that includes the image reading device and an image forming device to form an image according to the image read with the image reading device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is a control block diagram of the entire ADF;

FIG. 6 is a block diagram of a drive system of the ADF of FIG. 1;

Figure 1:
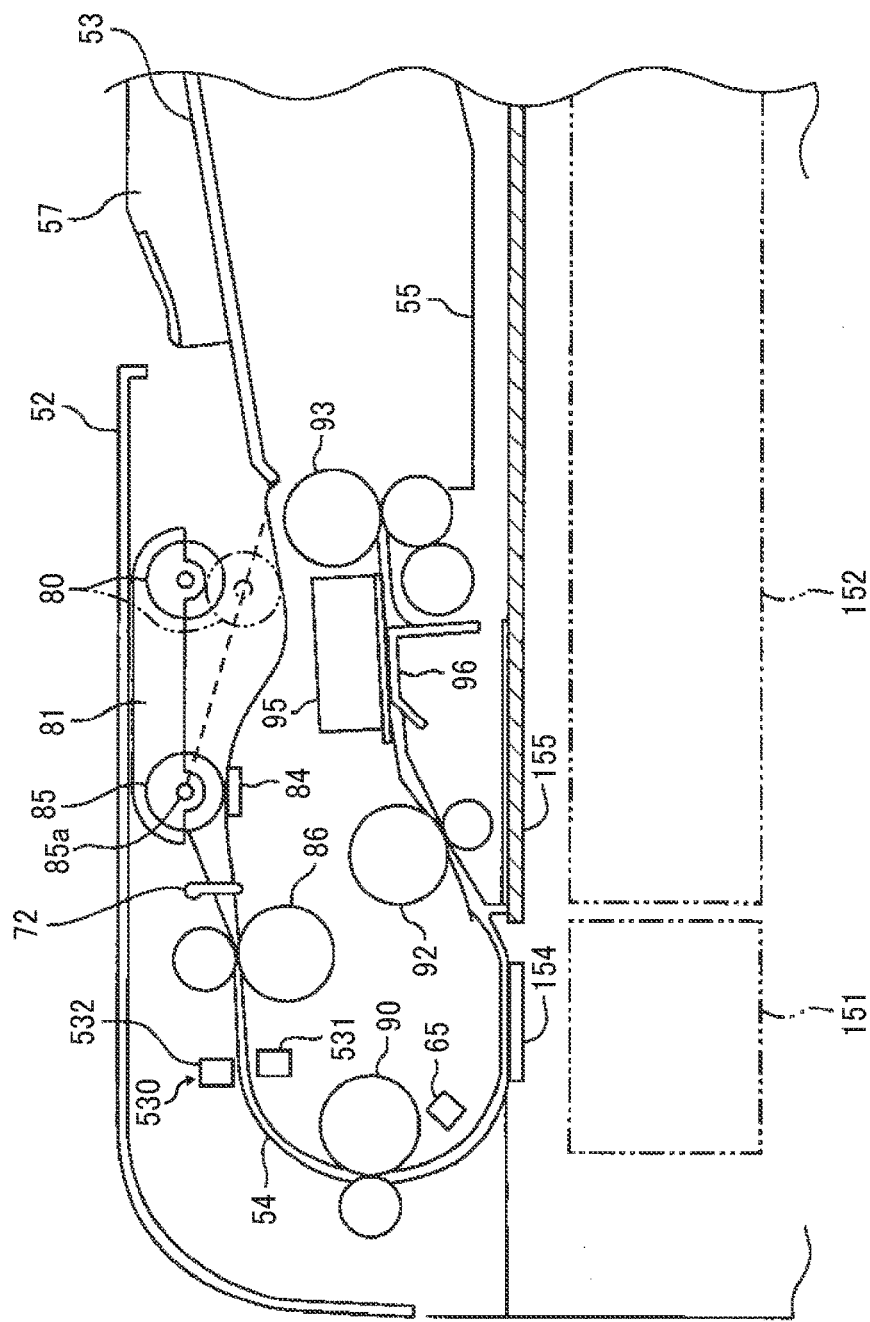
FIG. 1 is an enlarged view of a configuration of an automatic document feeder (ADF) of an image forming apparatus according to an embodiment of the present disclosure.

The accompanying drawings are intended to depict embodiments of the present disclosure and should not be interpreted to limit the scope thereof The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Below, an automatic document feeder (ADF) is described as a sheet conveying device of an image reading device disposed in an image forming apparatus, such as a copier or a facsimile machine, according to an embodiment of the present disclosure. Note that the sheet conveying device according to an embodiment of the present disclosure is not limited to the ADF and may be, for example, a sheet feeder to convey a recording medium, such as a recording sheet of paper, from a sheet loading unit in an image forming apparatus. The sheet conveying device according to an embodiment of the present disclosure is not limited to the sheet conveying device of an image forming apparatus or an image reading device, and may be applicable to various types of sheet conveying devices to convey a sheet.

Figure 2:
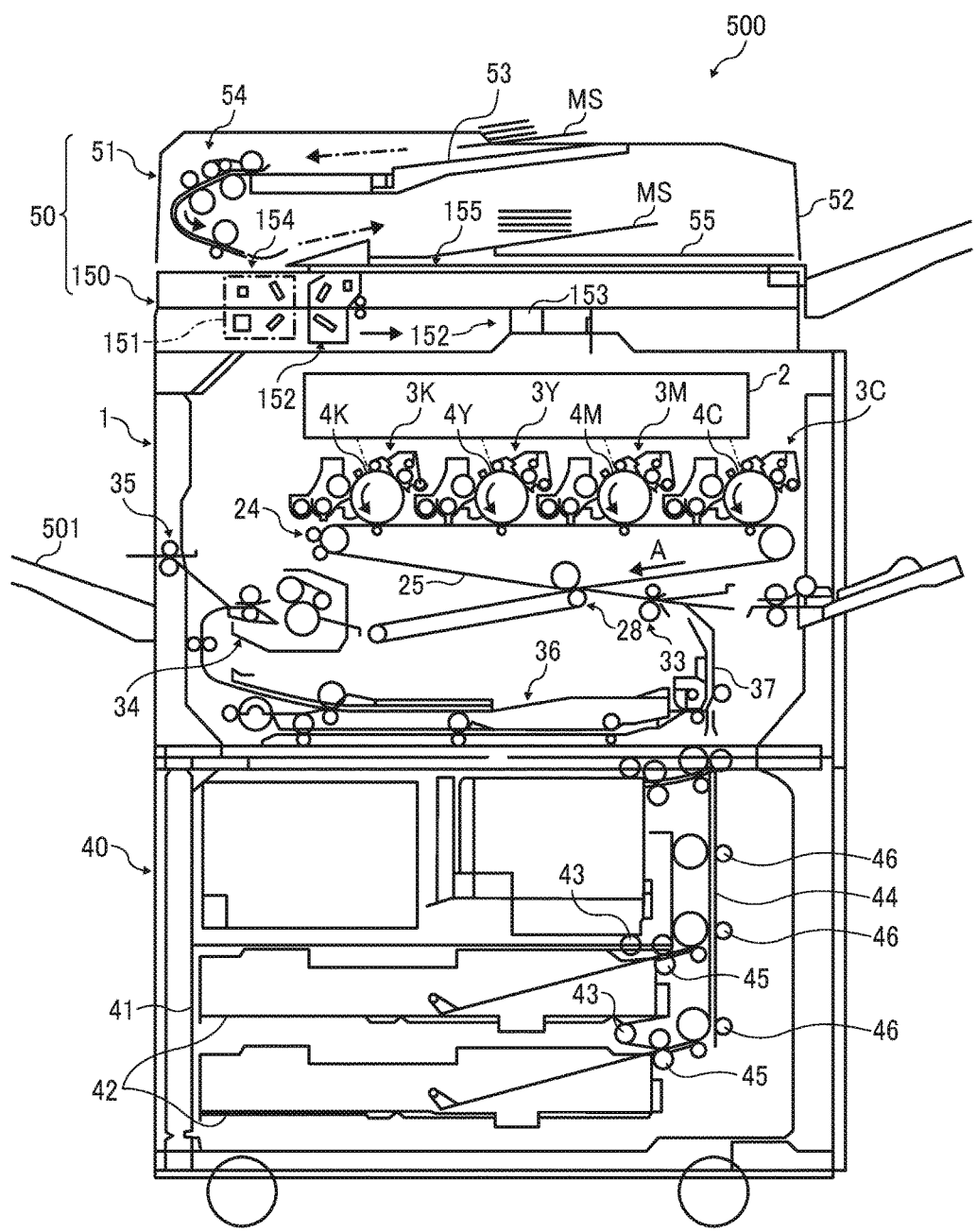
FIG. 2 is a schematic view of a configuration of the image forming apparatus of FIG. 1.

First, a description is given of a configuration of an image forming apparatus 500 according to the present embodiment of this disclosure. FIG. 2 is a schematic view of a configuration of the image forming apparatus 500, which is illustrated as a copier, according to the present embodiment. The image forming apparatus 500 according to the present embodiment includes an image forming unit 1 as an image forming device, a recording-sheet supply device 40, and an image reading unit 50 as the image reading device. The image reading unit 50 includes a scanner 150 as an image reader secured on the image forming unit 1 and an ADF 51 supported by the scanner 150.

The recording-sheet supply device 40 includes two recording-sheet feeding cassettes 42 disposed at multi-stages in a sheet bank 41. The recording-sheet supply device 40 further includes, for example, recording-sheet feeding rollers 43 to feed a recording sheet P from each of the recording-sheet feeding cassettes 42 and recording-sheet separation rollers 45 to separate and supply the recording sheet P to a recording-sheet feed path 44. The recording-sheet supply device 40 further includes, for example, a plurality of paired conveyance rollers 46 to convey the recording sheet P as a recording medium to a body-side recording-sheet feed path 37 as a recording-sheet conveyance path of the image forming unit 1. Thus, the recording-sheet supply device 40 feeds the recording sheet P in the recording-sheet feeding cassettes 42 to the body-side recording-sheet feed path 37 in the image forming unit 1.

The image forming unit 1 includes, for example, an optical writing device 2 and four process units 3K, 3Y, 3M, and 3C to form toner images of black, yellow, magenta, and cyan (K, Y, M, and C), respectively. The image forming unit 1 includes, for example, a transfer unit 24, a sheet conveying unit 28, paired registration rollers 33, a fixing device 34, a recording-sheet reverse device 36, and the body-side recording-sheet feed path 37. The optical writing device 2 drives a light source, such as a laser diode or a light emitting diode (LED), disposed inside the optical writing device 2, to emit laser light L to four drum-shaped photoconductors 4K, 4Y, 4M, and 4C. By emitting the laser light L, electrostatic latent images are formed on the surfaces of the photoconductors 4K, 4Y, 4M, and 4C and developed into toner images through a predetermined developing process.

Figure 3:
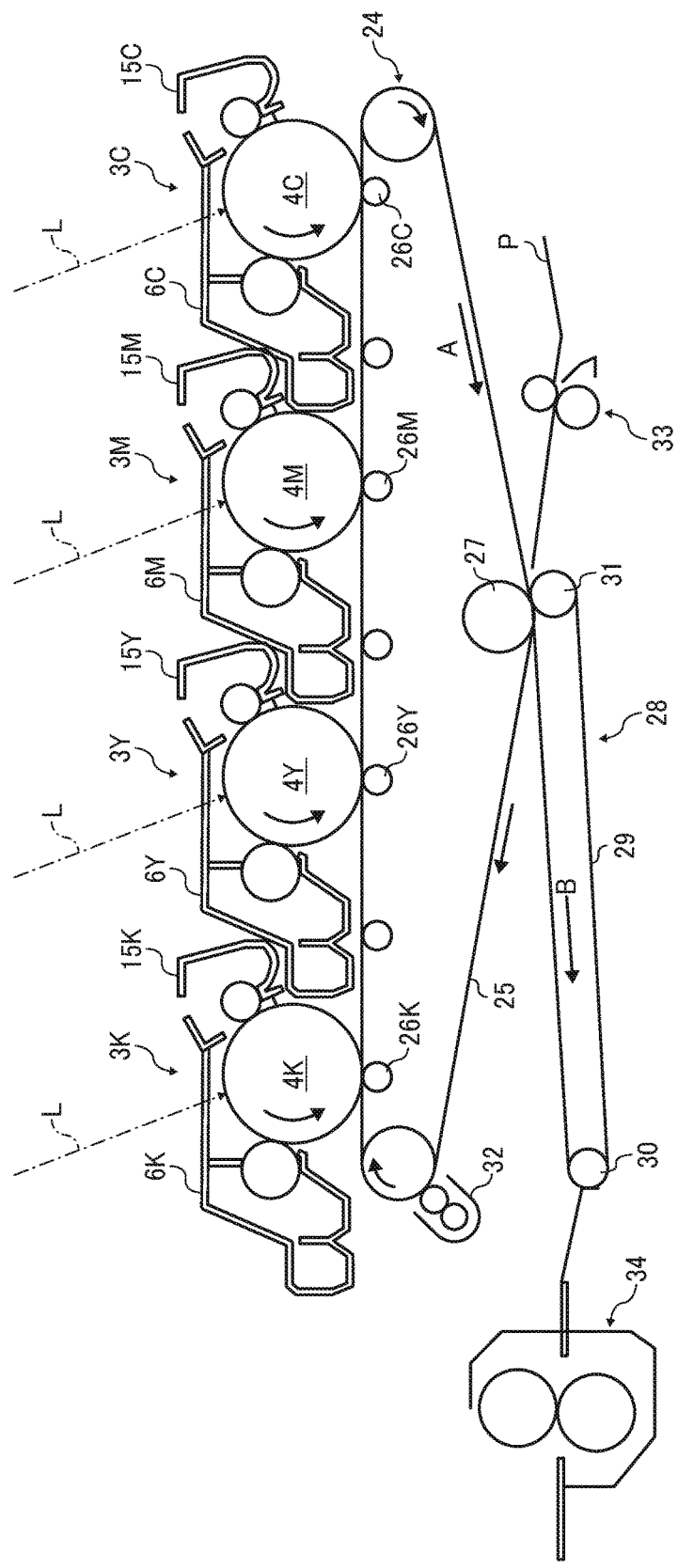
FIG. 3 is an enlarged view of a configuration of a portion of an image forming unit of the image forming apparatus of FIG. 1.
Figure 4:
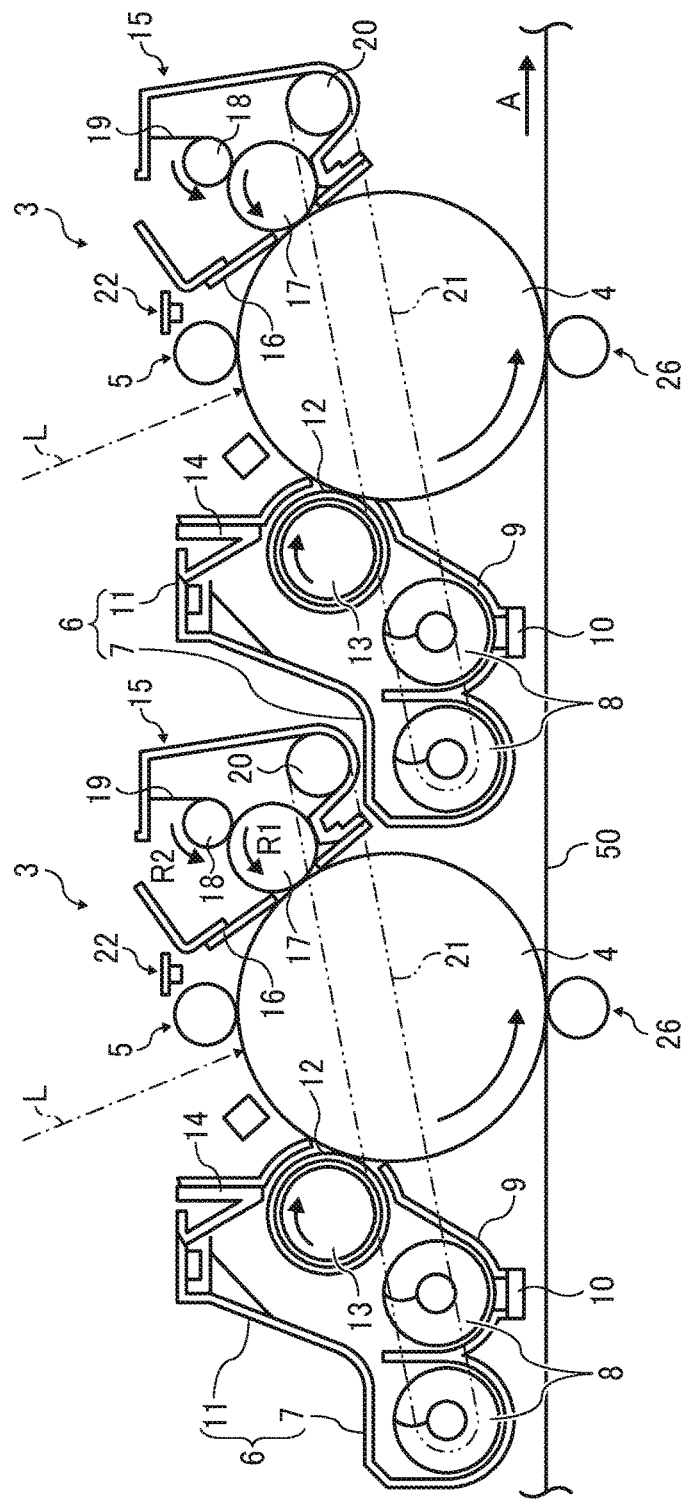
FIG. 4 is an enlarged view of a portion of a tandem section including four process units in the image forming unit of FIG. 3.

FIG. 3 is a partially-enlarged view of an internal configuration of the image forming unit 1. FIG. 4 is a partially-enlarged view of a tandem section including the process units 3K, 3Y, 3M, and 3C. The process units 3K, 3Y, 3M, and 3C have substantially the same configuration except for different colors of toner to be used. Therefore, in FIG. 4, subscripts of each numeral code, which represent toner colors, such as K, Y, M, and C, are omitted.

In each of the process units 3K, 3Y, 3M, and 3C, the photoconductor 4 and surrounding devices are supported by a common support as a single unit. Each of the process units 3K, 3Y, 3M, and 3C is detachably attached relative to the image forming unit 1 of the image forming apparatus 500. Each process unit 3 includes, for example, a charging device 5, a developing device 6, a drum cleaning device 15, and a discharging lamp 22 around the photoconductor 4. The image forming apparatus 500 has a so-called tandem configuration in which the process units 3K, 3Y, 3M, and 3C are arranged side by side in an endless moving direction of an intermediate transfer belt 25 so as to be opposed each other.

The photoconductor 4 has a drum shape in which a photoconductive layer is formed on an original pipe made of, e.g., aluminum by application of an inorganic photoconductive material having photosensitivity. Note that the photoconductor 4 may have a shape of endless belt.

The developing device 6 develops an electrostatic latent image with two-component developer containing magnetic carrier and non-magnetic toner. The developing device 6 includes, for example, a stirring section 7 and a developing section 11. The stirring section 7 conveys the two-component developer stored in the stirring section 7 while stirring the two-component developer, to supply the two-component developer to a developing sleeve 12. The developing section 11 transfers toner in the two-component developer, which is borne on the developing sleeve 12, onto the photoconductor 4.

The stirring section 7 is disposed at a position lower than the developing section 11. The stirring section 7 includes, for example, two conveying screws 8 arranged in parallel to each other, a partition plate between the conveying screws 8, and a toner density sensor 10 at a bottom of a developing case 9.

The developing section 11 includes, for example, the developing sleeve 12 opposed to the photoconductor 4 through an opening of the developing case 9, a magnet roller 13 unrotatably disposed in the developing sleeve 12, and a doctor blade 14 having a leading end to approach the developing sleeve 12. The developing sleeve 12 is non-magnetic, rotatable, and cylindrical. The magnet roller 13 includes a plurality of magnetic poles sequentially arranged toward a rotation direction of the developing sleeve 12 from an opposed position at which the magnet roller 13 is opposed to the doctor blade 14. The magnetic force of each magnetic pole acts on the two-component developer on the developing sleeve 12 at a predetermined position in the rotation direction of the developing sleeve 12. Accordingly, the two-component developer supplied from the stirring section 7 is attracted to and borne on the surface of the developing sleeve 12, and a magnetic brush is formed along magnetic lines of force on the surface of the developing sleeve 12.

When the magnetic brush passes the opposed position to the doctor blade 14 with rotation of the developing sleeve 12, the magnetic brush is restricted to a proper layer thickness and conveyed to a developing area opposed to the photoconductor 4. A potential difference between a developing bias applied to the developing sleeve 12 and an electrostatic latent image on the photoconductor 4 causes toner to be transferred onto the electrostatic latent image and contribute to the developing image. The two-component developer, which has formed the magnetic brush, has been borne on the developing sleeve 12, and has passed the developing area, returns to the developing section 11 again with rotation of the developing sleeve 12. By action of a repulsive magnetic field formed between the magnetic poles of the magnet roller 13, the two-component developer is detached from the surface of the developing sleeve 12 and returned into the stirring section 7. Based on a detection result of the toner density sensor 10, a proper amount of the two-component developer is supplied into the stirring section 7. The developer used in the developing device 6 may be one-component developer containing no magnetic carrier, instead of the two-component developer.

In the present embodiment, the drum cleaning device 15 employs a method of pressing a cleaning blade 16 made of an elastic body against the photoconductor 4. However, in some embodiments, any other suitable cleaning method may be used. In the present embodiment, to enhance the cleaning performance, the drum cleaning device 15 further includes a fur brush 17 of contact conductivity. The fur brush 17 has an outer circumferential surface to contact the photoconductor 4 and is rotatable in a direction indicated by arrow R1 in FIG. 4. The fur brush 17 also scrapes lubricant from solid lubricant to form fine powder, and applies the fine powder onto the surface of the photoconductor 4. An electric field roller 18 made of metal to apply bias to the fur brush 17 is disposed to be rotatable in a direction indicated by arrow R2 in FIG. 4. A leading end of a scraper 19 is pressed against the electric field roller 18.

Toner adhering from the photoconductor 4 to the fur brush 17 is transferred onto the electric field roller 18. The electric field roller 18 is applied with bias while contacting the fur brush 17 and rotating in a counter direction relative to the fur brush 17. Toner transferred onto the electric field roller 18 is scraped from the electric field roller 18 by the scraper 19 and falls onto a collecting screw 20. The collecting screw 20 conveys collected toner, which has been collected from the surface of the photoconductor 4 with the fur brush 17 and the cleaning blade 16, toward an end of the drum cleaning device 15 in a direction perpendicular to a surface of a sheet of paper on which FIG. 4 is printed, and delivers the collected toner to an external recycle conveying device 21. The external recycle conveying device 21 sends the collected toner to the developing device 6 for recycle.

The discharging lamp 22 discharges the surface of the photoconductor 4 by emission of light. After the surface of the photoconductor 4 discharged by the discharging lamp 22 is uniformly charged with the charging device 5, the optical writing device 2 performs optical writing processing. In the image forming apparatus 500 according to the present embodiment, the charging device 5 is a charging roller that is applied with charging bias and rotates while contacting the photoconductor 4. However, in some embodiments, the charging device 5 may be a scorotron charger that performs a charging process on the photoconductor 4 in non-contact with the photoconductor 4.

According to the above-described processes, toner images of black, yellow, magenta, and cyan are formed on the photoconductors 4K, 4Y, 4M, and 4C of the process units 3K, 3Y, 3M, and 3C illustrated in FIG. 3.

The transfer unit 24 is disposed below the process units 3K, 3Y, 3M, and 3C. In the transfer unit 24, the intermediate transfer belt 25 stretched taut with a plurality of rollers contacts the photoconductors 4K, 4Y, 4M, and 4C to form primary transfer nips for K, Y, M, and C. In the transfer unit 24, one of the plurality of rollers stretching the intermediate transfer belt 25 taut is driven to rotate as a drive roller, to endlessly move the intermediate transfer belt 25 in a direction indicated by arrow A (i.e., clockwise direction) in FIG. 3.

In proximity to the four primary transfer nips are primary transfer rollers 26K, 26Y, 26M, and 26C and disposed inside a loop formed by the intermediate transfer belt 25. The primary transfer rollers 26K, 26Y, 26M, and 26C press the intermediate transfer belt 25 against the photoconductors 4K, 4Y, 4M, and 4C, respectively. Each of the primary transfer rollers 26K, 26Y, 26M, and 26C is applied with a primary transfer roller bias from a power supply. Accordingly, primary transfer electric fields that electrostatically transfer black, yellow, magenta, and cyan toner images formed on the photoconductors 4K, 4Y, 4M, and 4C onto the intermediate transfer belt 25 are formed at the four primary transfer nips for K, Y, M, and C, respectively. The toner images are preliminarily transferred at the primary transfer nips for K, Y, M, and C in turn so as to be superimposed one on another on an outer surface of the intermediate transfer belt 25, which sequentially passes the primary transfer nips for K, Y, M, and C with endless movement in the direction indicated by arrow A (clockwise direction) in FIGS. 2 and 3. By the superimposing primary transfer, four-color superimposing toner images (hereinafter, four-color toner images) are formed on the outer surface of the intermediate transfer belt 25.

In FIG. 4, the sheet conveying unit 28 is disposed below the transfer unit 24. In the sheet conveying unit 28, a sheet conveyor belt 29 having an endless shape is stretched between a sheet-conveying-belt driving roller 30 and a secondary transfer roller 31, to endlessly move. As illustrated in FIGS. 2 and 3, the intermediate transfer belt 25 and the sheet conveyor belt 29 are sandwiched between a secondary transfer roller 31 and a lower tension roller 27, which is one of the plurality of rollers stretching taut the intermediate transfer belt 25. Accordingly, the outer surface of the intermediate transfer belt 25 and the outer surface of the sheet conveyor belt 29 contact each other to form a secondary transfer nip. The secondary transfer roller 31 is applied with a secondary transfer bias from a power supply and the lower tension roller 27 is earthed. Thus, a secondary transfer electric field is formed at the secondary transfer nip.

The paired registration rollers 33 are disposed at a right side of secondary transfer nip in FIG. 3. A registration roller sensor is disposed near an entry of a registration nip of the paired registration rollers 33. A recording sheet P is conveyed from the recording-sheet supply device 40 toward the paired registration rollers 33. When a predetermined time passes after the registration roller sensor detects a leading end of the recording sheet P, the conveyance of the recording sheet P temporarily stops and the leading end of the recording sheet P hits the registration nip of the paired registration rollers 33. As a result, the posture of the recording sheet P is corrected and ready to synchronize with image formation.

When the leading end of the recording sheet P hits the registration nip, the paired registration rollers 33 resume rotation so that the recording sheet P can synchronize with the four-color toner images on the intermediate transfer belt 25, thus feeding the recording sheet P to secondary transfer nip. In the secondary transfer nip through the recording sheet P passes, the four-color toner images on the intermediate transfer belt 25 are collectively and secondarily transferred onto the recording sheet P by action of the secondary transfer electric field and nip pressure, to form a full-color image together with white color of the recording sheet P. When the recording sheet P passes the secondary transfer nip, the recording sheet P separates from the intermediate transfer belt 25 and is conveyed to the fixing device 34 by endless movement of the sheet conveyor belt 29 while being held on the outer surface of the sheet conveyor belt 29.

Non-transferred residual toner, which has not transferred onto the recording sheet P at the secondary transfer nip, adheres to the outer surface of the intermediate transfer belt 25 having passed the secondary transfer nip. The non-transferred residual toner is scraped and removed with a belt cleaning device 32 that includes a cleaner to contact the intermediate transfer belt 25.

The full-color image is fixed on the recording sheet P, which has been conveyed to the fixing device 34, under pressure and heat in the fixing device 34. The recording sheet P, on which the full-color image has been fixed, is sent from the fixing device 34 to paired sheet ejection rollers 35 and ejected to a sheet ejection tray 501 outside the image forming apparatus 500.

As illustrated in FIG. 2, the recording-sheet reverse device 36 is disposed below the sheet conveying unit 28 and the fixing device 34. In duplex printing, the conveyance path of the recording sheet P having one side on which the image fixing process has been performed is switched toward the recording-sheet reverse device 36 by a switching claw. In the recording-sheet reverse device 36, the recording sheet P is reversed and entered into the secondary transfer nip again. After the secondary transfer process and the fixing process are performed on the other side of the recording sheet P, the recording sheet P is ejected onto the sheet ejection tray 501.

Next, a description is given of the image reading unit 50 secured on the image forming unit 1. FIG. 1 is an enlarged view of a configuration of the ADF 51. The image reading unit 50 includes the scanner 150, the ADF 51 secured on the scanner 150, two stationary image reading units, and a movable reading unit 152. The image reading unit 50 can use two types of document reading methods. One is a document stationary reading method in which the ADF 51 is closed with a document MS placed on a second exposure glass 155 and the surface of the document MS is read with the movable reading unit 152. Second is a document conveying reading method in which the document MS is placed on a document loading table 53 of the ADF 51 and conveyed onto a first exposure glass 154, and the surface of the document MS is read with a first stationary reading unit 151 and a second stationary reading unit 95.

The movable reading unit 152 is disposed immediately below the second exposure glass 155 to move optical components, such as a light source and a plurality of reflection mirrors, in left and right directions (in a horizontal direction) in FIG. 1. The second exposure glass 155 is mounted on an upper wall of a casing of the scanner 150 so as to contact the document MS. In the course of moving the optical components from left to right in FIG. 1, the light source emits light. After a lower face of the document MS placed on the second exposure glass 155 reflects the light, the reflected light is further reflected on the plurality of reflection mirrors until an image reading sensor 153, such as a charge-coupled device (CCD) module or a contact image sensor (CIS) module, which is secured to the scanner 150 receives the reflected light.

The image reading unit 50 further includes the first stationary reading unit 151 and the second stationary reading unit 95 as stationary image reading units. The first stationary reading unit 151 is disposed inside the scanner 150. The second stationary reading unit 95 is disposed inside the ADF 51. The first stationary reading unit 151 includes, for example, a light source, a plurality of reflection mirrors, and a plurality of image reading sensors, such as CCD sensors. The first stationary reading unit 151 is disposed immediately below the first exposure glass 154, which is mounted on the upper wall of the casing of the scanner 150, so as to contact the document MS. When the document MS conveyed by the ADF 51 passes over the first exposure glass 154, the light source emits light. After a first face of the document MS sequentially reflects the light, the reflected light is further reflected on the plurality of reflection mirrors until the image reading sensor 153 receives the reflected light. With the above-described actions, the first face of the document MS is scanned without moving the optical components such as the light source and the plurality of reflection mirrors. The second stationary reading unit 95 scans a second face of the document MS after the document MS has passed the first stationary reading unit 151.

The ADF 51 disposed on the scanner 150 includes a cover 52, the document loading table 53, a document conveyance path 54, and a document stacking table 55. The document loading table 53 is a part on which the document MS is loaded before being scanned. The document MS as a sheet is conveyed along the document conveyance path 54. The document stacking table 55 is a part on which the document MS is stacked after being scanned. The configuration of the ADF 51 in the present embodiment is broadly classified into a document setting section, a separation feeding section, a leading-end detecting section, a turning section, a first reading conveyance section, a second reading conveyance section, a sheet ejecting section, and a stacking section.

The document setting section includes, for example, the document loading table 53 on which a bundle of documents MS are set with the first face of each document MS faced up. The document setting section has a configuration that the leading end of the document MS set on the document loading table 53 is placed within the cover 52 of the ADF 51. The document loading table 53 are mounted with movable left- and right-side guide plates 57 to position the document MS, which has been set to the ADF 51, with respect to a sheet width direction perpendicular to a sheet feeding direction The side guide plates 57 can relatively approach and separate from each other so as to match the centers of the document loading table 53 and the document MS in the sheet width direction. However, in some embodiments, for example, the side guide plates 57 may be disposed so that, with one edge of the document MS contacting one end of the document loading table 53, only the opposite edge is movable.

The separation feeding section separates and feeds the document MS from the bundle of documents MS, which are set to the document loading table 53, sheet by sheet. The separation feeding section includes, for example, a pickup roller 80, a feed roller 85, and a separation pad 84. The pickup roller 80 delivers the document MS, which has been set on the document loading table 53, in the sheet feeding direction. The feed roller 85 feeds the document MS, which has been delivered by the pickup roller 80 in the sheet feeding direction, toward the document conveyance path 54. The separation pad 84 is disposed corresponding to the feed roller 85.

The document MS, which has been fed by the separation feeding section, is detected with a contact sensor 72 of the leading-end detecting section when the leading end of the document MS hits the contact sensor 72. Then, the document MS is further conveyed with a first paired conveying rollers 86 and a second paired conveying rollers 90 and sent to the first reading conveyance section. The first reading conveyance section conveys the document MS on the first exposure glass 154 made of a platen glass. The first reading conveyance section, while conveying the document MS, reads the first face of the document MS with the first stationary reading unit 151, which is disposed within the scanner 150, from below the first exposure glass 154.

In the second reading conveyance section, the second stationary reading unit 95 reads the second face of the document MS while the document MS, which has passed a first reading position of the first stationary reading unit 151, is guided with a white guide 96 disposed below the second stationary reading unit 95. The white guide 96 restricts floating of the document MS at a second reading position of the second stationary reading unit 95 and acts as reference white portion to acquire shading data in the second stationary reading unit 95.

The sheet ejecting section ejects the document MS, which has passed the first reading position of the first stationary reading unit 151 and the second reading position of the second stationary reading unit 95, toward the stacking section. The stacking section stacks the document MS on the document stacking table 55 after the reading of the document MS is completed.

In the present embodiment, a multifeed detecting unit 530 as multifeed detector is disposed between the first paired conveying rollers 86 of the leading-end detecting section and the second paired conveying rollers 90 of the turning section. The multifeed detecting unit 530 detects occurrence of multifeed that means an overlapping state of a plurality of documents MS having passed the separation feeding section.

FIG. 5 is a control block diagram of the ADF 51. A control unit of the ADF 51 includes a controller 100 to control operations of, for example, a document feed motor 102, various types of sensors, and a stationary image reading unit 300. The document feed motor 102 is a driving unit to drive the conveying operation of the document MS. The stationary image reading unit 300 illustrated in FIG. 5 includes the first stationary reading unit 151 and the second stationary reading unit 95.

The bundle of documents MS to be read are set on the document loading table 53 in a state in which the first face of each document MS is faced up. A setting feeler is swingably disposed above the document loading table 53. When the document MS is set to the document loading table 53, the position of the setting feeler changes. A document set sensor 63 detects the change of the position of the setting feeler and send a detection signal to the controller 100. The detection signal is sent from the controller 100 to an interface circuit 107 via an apparatus controller 111 of the image reading unit 50.

The pickup roller 80 to feed the document MS from the bundle of documents MS on the document loading table 53 is driven to rotate by a driving force transmitted from the document feed motor 102. The feed roller 85 to separate and feed one of the documents MS delivered by the pickup roller 80 is also driven to rotate by a driving force transmitted from the document feed motor 102.

When the controller 100 receives a document feed signal being a sheet feed command from the apparatus controller 111, the controller 100 moves the pickup roller 80 downward so as to approach the pickup roller 80 toward the document loading table 53 and contact the pickup roller 80 to an upper face of a topmost one of the bundle of documents MS. The pickup roller 80 rotates in the sheet feeding direction to perform, for example, calling operation to feeding a topmost one of the documents MS on the document loading table 53. When image reading operation is finished on all of the documents MS set on the document loading table 53 and all of the documents MS are ejected, the pickup roller 80 is moved upward to separate away from the document loading table 53 and stop at a predetermined standby position. Accordingly, the next document MS can be set on the document loading table 53.

The pickup roller 80 is held by a pickup holder 81. The pickup holder 81 is swingably supported on a feed roller shaft 85a of the feed roller 85 via a bidirectional torque limiter. Accordingly, when the feed roller shaft 85a of the feed roller 85 is driven to rotate in the sheet feeding direction, the pickup holder 81 swings around the feed roller shaft 85a to lower the pickup roller 80. When the feed roller shaft 85a of the feed roller 85 is driven to rotate in the direction opposite the sheet feeding direction, the pickup holder 81 swings around the feed roller shaft 85a to raise the pickup roller 80.

The pickup roller 80 is coupled to the feed roller shaft 85a via, for example, an endless belt for drive transmission and a pulley. Thus, the pickup roller 80 rotates with rotation of the feed roller shaft 85a of the feed roller 85.

FIG. 6 is a block diagram of a driving system of the ADF 51 in the present embodiment. The feed roller shaft 85a of the feed roller 85 is driven to rotate by the document feed motor 102. The feed roller shaft 85a of the feed roller 85 rotates forward or in reverse according to the output rotation direction of the document feed motor 102. The term "forward rotation" used herein means rotation in a first direction in which the document MS is conveyed in the sheet feeding direction. The term "reverse rotation" used herein means rotation in a second direction opposite the first direction.

When the output rotation direction of the document feed motor 102 is the forward rotation direction, a rotation force in the forward rotation direction is transmitted from the document feed motor 102 to the feed roller shaft 85a via a plurality of rotation transmitters, such as a plurality of gears. Thus, the feed roller shaft 85a is rotated in the forward rotation direction. Accordingly, the feed roller 85 and the pickup roller 80 rotate in the forward rotation direction and the pickup holder 81 swings. Thus, the pickup roller 80 moves in a direction to approach the document MS on the document loading table 53. When the output rotation direction of the document feed motor 102 is the reverse rotation direction, a rotation force in the forward rotation direction is transmitted from the document feed motor 102 to the feed roller shaft 85a via a plurality of rotation transmitters, such as a plurality of gears. Thus, the feed roller shaft 85a is rotated in the reverse rotation direction. Accordingly, the pickup holder 81 swings and the pickup roller 80 moves in a direction away from the document MS on the document loading table 53.

When the feed roller shaft 85a rotates in the reverse rotation direction, the pickup holder 81 swings upward and contacts the cover 52. At this time, excessive torque transmission and rotational force from the feed roller shaft 85a is cut off by the bidirectional torque limiter between the feed roller shaft 85a and the pickup holder 81. Accordingly, the pickup holder 81 keeps a contact state with the cover 52 during reverse rotation of the document feed motor 102.

By contrast, when the feed roller shaft 85a rotates in the forward rotation direction, the pickup holder 81 swings downward and the pickup roller 80 contacts the document MS. At this time, excessive torque transmission and rotational force from the feed roller shaft 85a to the pickup holder 81 is cut off by the bidirectional torque limiter between the feed roller shaft 85a and the pickup holder 81. Accordingly, the pickup roller 80 keeps a contact state with the document MS at a proper contact pressure during forward rotation of the document feed motor 102.

On a drive transmission route from the document feed motor 102 to the feed roller shaft 85a, as illustrated in FIG. 6, a document feed clutch 101 to switch coupling and decoupling of the driving side and the driven side. For example, the pickup time and conveyance interval (intersheet distance) of the document MS are controlled by switching ON (coupling or connection) and OFF (decoupling or cutoff) of the document feed clutch 101. In the present embodiment, the driving force of the document feed motor 102 is also transmitted to conveyance drivers, such as the first paired conveying rollers 86, the second paired conveying rollers 90, paired reading exit rollers 92, and paired ejection rollers 93. The document feed clutch 101 controls rotation of only the feed roller 85 and the pickup roller 80. The conveyance drivers, such as the first paired conveying rollers 86, the second paired conveying rollers 90, the paired reading exit rollers 92, and the paired ejection rollers 93, are constantly coupled to the output shaft of the document feed motor 102. Accordingly, the first paired conveying rollers 86, the second paired conveying rollers 90, the paired reading exit rollers 92, and the paired ejection rollers 93 simultaneously drive together.

The conveyance intervals of the documents MS are controlled with the document feed clutch 101. Specifically, the document feed clutch 101 is turned OFF at a predetermined time after the contact sensor 72 detects the leading end of the document MS (at a time at which the leading end of the document MS can reach the first paired conveying rollers 86 with some sufficient extra time). When the document feed clutch 101 is turned OFF, the rotation of each of the feed roller 85 and the pickup roller 80 stops. Even in such a case, the document MS is conveyed with the first paired conveying rollers 86 continuously rotating. At this time, a trailing end side of the document MS is sandwiched in a separation nip of the feed roller 85 and the separation pad 84 and between the pickup roller 80 and another document MS on the document loading table 53. However, since each of the feed roller 85 and the pickup roller 80 includes a built-in one-way clutch mechanism, the feed roller 85 and the pickup roller 80 rotate with movement of the document MS conveyed by the first paired conveying rollers 86. Thus, the document MS is securely conveyed. Then, when it is detected the trailing end of the document MS has passed the contact sensor 72, the document feed clutch 101 is turned ON at a predetermined time (corresponding to a target conveyance interval). Accordingly, the feeding of the next document MS is started. The next document MS is conveyed so as to secure a target conveyance interval (inter-sheet distance or inter-sheet time period) relative to the preceding document MS.

When a user designates a duplex reading mode or a simplex reading mode and presses a copy start key of an operation unit 108 with the document MS set on the document loading table 53, the apparatus controller 111 sends the document feed signal being the sheet feed command to the controller 100 of the ADF 51 via the interface circuit 107. Accordingly, when the document feed motor 102 starts driving in the forward rotation direction and the pickup roller 80 rotates in the forward rotation direction, the pickup holder 81 swings downward and the pickup roller 80 contacts the document MS. As a result, one or several (ideally, one) of the documents MS on the document loading table 53 is delivered (picked up) and sent to the separation nip between the separation pad 84 and the feed roller 85 by rotation of the pickup roller 80.

When the document MS, which has been picked up by the pickup roller 80, enters the separation nip, the topmost document MS contacting the feed roller 85 passes the separation nip with rotation of the feed roller 85. The rest of the documents MS having entered the separation nip is prevented from passing the separation nip by a friction force with the separation pad 84. As a result, even when several documents MS are picked up by the pickup roller 80, only the topmost document MS can pass the separation nip and be fed.

The leading end of the document MS, having passed the separation nip, is detected with the contact sensor 72. When the document MS further proceeds, the document MS obtains a conveyance force from the first paired conveying rollers 86 and passes a multifeed detection point of the multifeed detecting unit 530. The document MS obtains a conveyance force from the second paired conveying rollers 90 and is sent to the first reading conveyance section. The first stationary reading unit 151 reads the first face of the document MS according to leading-end detection timing of the document MS with a registration sensor 65.

After the document MS, which having passed the first reading conveyance section, passes a nip between the paired reading exit rollers 92, the document MS passes the second reading conveyance section and is conveyed to the sheet ejecting section. For the simplex reading mode to read only one side (first face) of the document MS, it is not necessary to read the second face of the document MS with the second stationary reading unit 95. In the duplex reading mode to read both sides (first face and second face) of the document MS, the second stationary reading unit 95 reads the second face of the document MS according to leading-end detection timing of the document MS with the registration sensor 65.

Figure 7:
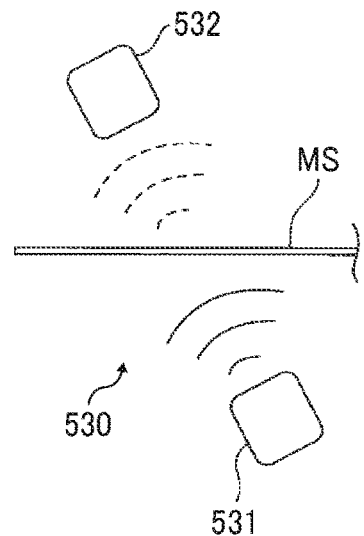
FIG. 7 is an illustration of a state in which one document is present at a multifeed detection point of a multifeed detecting unit in the ADF of FIG. 1.
Figure 8:
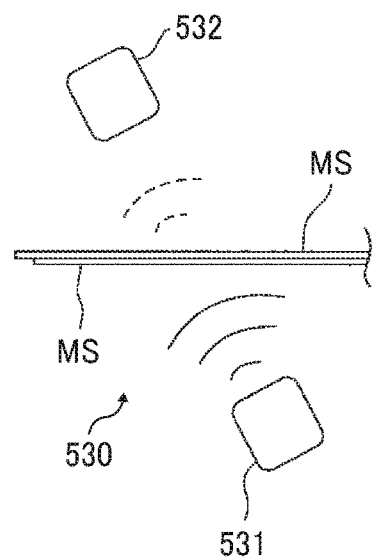
FIG. 8 is an illustration of a state in which two documents are present at the multifeed detection point of the multifeed detecting unit in the ADF of FIG. 1.

Next, a description is given of the multifeed detecting unit 530. FIG. 7 is an illustration of a state in which one document MS is present at the multifeed detection point of the multifeed detecting unit 530. FIG. 8 is an illustration of a state in which two documents MS are present at the multifeed detection point of the multifeed detecting unit 530. The multifeed detecting unit 530 in the present embodiment includes an ultrasonic emitting element 531 and an ultrasonic receiving element 532. The ultrasonic emitting element 531 and the ultrasonic receiving element 532 are disposed at an inner side and an outer side, respectively, relative to the document conveyance path 54 in the image forming apparatus 500. The ultrasonic emitting element 531 and the ultrasonic receiving element 532 are disposed opposite each other. The multifeed detection point of the multifeed detecting unit 530 is disposed downstream from the separation nip in a document conveyance direction of the document MS. In the present embodiment, the multifeed detection point of the multifeed detecting unit 530 is disposed downstream from the detection position of the contact sensor 72 in the document conveyance direction.

The multifeed detecting unit 530 in the present embodiment determines multifeed or non-multifeed according to the intensity at which an ultrasonic wave emitted from the ultrasonic emitting element 531 is received by the ultrasonic receiving element 532 through the document MS passing the document conveyance path 54. For example, as illustrated in FIG. 7, when only one document MS is present at the multifeed detection point of the multifeed detecting unit 530, the ultrasonic receiving element 532 receives a strong ultrasonic wave greater than a predetermined threshold and the ultrasonic receiving element 532 outputs a H-level signal. As illustrated in FIG. 8, when two or more documents MS are present at the multifeed detection point of the multifeed detecting unit 530, the ultrasonic receiving element 532 receives a weak ultrasonic wave not greater than the predetermined threshold and the ultrasonic receiving element 532 outputs a L-level signal. Accordingly, the multifeed detecting unit 530 can determine multifeed or non-multifeed based on whether the output signal level of the ultrasonic receiving element 532 is H-level or L-level.

For example, a timer starts counting from a time when the leading end of the document MS fed from the separation nip is detected with the contact sensor 72. When the timer reaches a count value at which the leading end of the document MS arrives at the multifeed detection point of the multifeed detecting unit 530, the ultrasonic emitting element 531 starts emission of an ultrasonic wave to start multifeed detecting operation. For example, when the leading end of the document MS is conveyed by 25 mm after the leading end arrives at the multifeed detection point of the multifeed detecting unit 530, the emission of an ultrasonic wave is started to start the multifeed detecting operation. In the present embodiment, to reduce influences of fluttering and deformation of the leading end of the document MS, multifeed detecting operation is not performed when a leading end portion of the document MS is present at the multifeed detection point by a predetermined length (in this example, 25 mm) in the sheet feed direction from the leading end of the document MS. Note that the predetermined length is not limited to 25 mm and may be any suitable length.

In response to detection of the trailing end of the document MS with the contact sensor 72, the multifeed detecting unit 530 stops emission of an ultrasonic wave and stops the multifeed detecting operation. In the present embodiment, to reduce influences of fluttering and deformation of the trailing end of the document MS, multifeed detecting operation is not performed when a trailing end portion of the document MS is present at the multifeed detection point by a predetermined length (in this example, a length corresponding to a conveyance distance between the detection position of the contact sensor 72 and the multifeed detection point) in the sheet feed direction from the trailing end of the document MS. The predetermined length of the trailing end portion of the document MS can also be any suitable length.

As described above, in the present embodiment, a multifeed detection period of the document MS with the multifeed detecting unit 530 is determined in response to detection of the leading end and the trailing end of the document MS with the contact sensor 72. A time interval between the detection of the leading end and the detection of the trailing end of the document MS with the contact sensor 72 is data corresponding to a length of the document MS in the document conveyance direction. Accordingly, according to the present embodiment, the multifeed detecting operation with the multifeed detecting unit 530 can be performed over an entire span of the document MS in the document conveyance direction. Such a configuration allows detection of various types of multifeed, such as multifeed occurring near the leading end of the document MS (multifeed in a state in which leading ends of a plurality of documents MS are aligned) and multifeed occurring near the trailing end of the document MS (multifeed in a state in which a leading end portion of an document MS overlaps a portion near the trailing end of another document MS).

In the present embodiment, as described above, the multifeed detecting operation is not performed on the leading end portion and the trailing end portion of the document MS. However, in some embodiments, the multifeed detecting operation may not be performed on only the leading end portion or the trailing end portion of the document MS. Alternatively, the multifeed detecting operation may be performed on the entire area of the document MS in the document conveyance direction.

In the present embodiment, the ultrasonic receiving element 532 is mounted on the cover 52. Accordingly, when the cover 52 is opened during the multifeed detecting operation (during passage of the document MS), the distance between the ultrasonic emitting element 531 and the ultrasonic receiving element 532 increases. Thus, the multifeed detecting unit 530 determines that multifeed has occurred. In the present embodiment, opening of the cover 52 has been detected before the multifeed detecting unit 530 determines that multifeed has occurred. Such a configuration prevents the multifeed detecting unit 530 from erroneously determining the occurrence of multifeed even if the cover 52 is opened during the multifeed detecting operation.

Here, for example, when the multifeed detecting unit 530 fails or an abnormality occurs in a line connected to the multifeed detecting unit 530, the multifeed detecting unit 530 might make a false determination on multifeed. For example, the multifeed detecting unit 530 might determine that multifeed has occurred when the multifeed has not occurred or that multifeed has not occurred when the multifeed has occurred. Accordingly, the controller 100 according to the present embodiment performs, at predetermined multifeed abnormality detection timing, multifeed abnormality detection control to make a self-diagnosis on whether an abnormality has occurred in the multifeed detecting unit 530.

In the multifeed abnormality detection control in the present embodiment, the controller 100 confirms the following two signal levels in a state in which the document MS is not present at the multifeed detection point of the multifeed detecting unit 530, to detect the presence or absence of an abnormality of the multifeed detecting unit 530. First, in a state in which no ultrasonic wave is emitted from the ultrasonic emitting element 531, the controller 100 confirms whether the output signal of the ultrasonic receiving element 532 is at the L-level (the intensity of the received ultrasonic wave is low). Second, in a state in which an ultrasonic wave is emitted from the ultrasonic emitting element 531, the controller 100 confirms whether the output signal of the ultrasonic receiving element 532 is at the H-level (the intensity of the received ultrasonic wave is high).

When the output signal of the ultrasonic receiving element 532 is at the H level in the first confirmation or the output signal of the ultrasonic receiving element 532 is at the L level in the second confirmation, the controller 100 determines that an abnormality has occurred in the multifeed detecting unit 530. In this case, the controller 100 transmits, to the apparatus controller 111 via the interface circuit 107, information indicating that an abnormality has occurred in the multifeed detecting unit 530. As a result, the apparatus controller 111 executes abnormality notification processing of, e.g., displaying a notification image notifying the abnormality of the multifeed detecting unit 530 on a screen of the operation unit 108. In the present embodiment, when the controller 100 determines that an abnormality has occurred in the multifeed detecting unit 530, the controller 100 executes, for example, processing of disabling multifeed detection function. As a result, although the document MS is continuously conveyed and the image reading operation is continued, multifeed detection is not performed. The processing performed when the controller 100 determines that an abnormality has occurred in the multifeed detecting unit 530 is not limited to the above-described processing but may be any other suitable processing.

In the present embodiment, the multifeed abnormality detection control is started after the controller 100 receives the document feed signal as the sheet feed command, and is finished before the document MS is conveyed to the multifeed detection point of the multifeed detecting unit 530. In other words, the multifeed abnormality detection control is performed in parallel with the pickup operation of the document MS from the document loading table 53 with the pickup roller 80, the separation feed operation at the separation nip formed with the separation pad 84 and the feed roller 85, and the conveying operation of the original document MS with the first paired conveying rollers 86. Accordingly, since the pickup operation is started without waiting for the end of the multifeed abnormality detection control, there is no occurrence of a standby time for conveying the document MS due to the execution of the multifeed abnormality detection control. In the present embodiment, the multifeed abnormality detection control is finished before the document MS is conveyed to the multifeed detection point of the multifeed detecting unit 530. Such a configuration prevents the multifeed detecting unit 530, in which an abnormality has occurred, from making an erroneous determination or prevents erroneous post-processing according to an erroneous determination from being performed even if the erroneous determination is made.

In the present embodiment, more specifically, the multifeed abnormality detection control is executed while the pickup roller 80 moves downward to pick up a first one of the document MS sent out from the document loading table 53. However, the multifeed abnormality detection control can be executed in any period of time if the multifeed abnormality detection control ends after the controller 100 receives the sheet feed command and before the document MS is conveyed to the multifeed detection point of the multifeed detecting unit 530.

Figure 9:
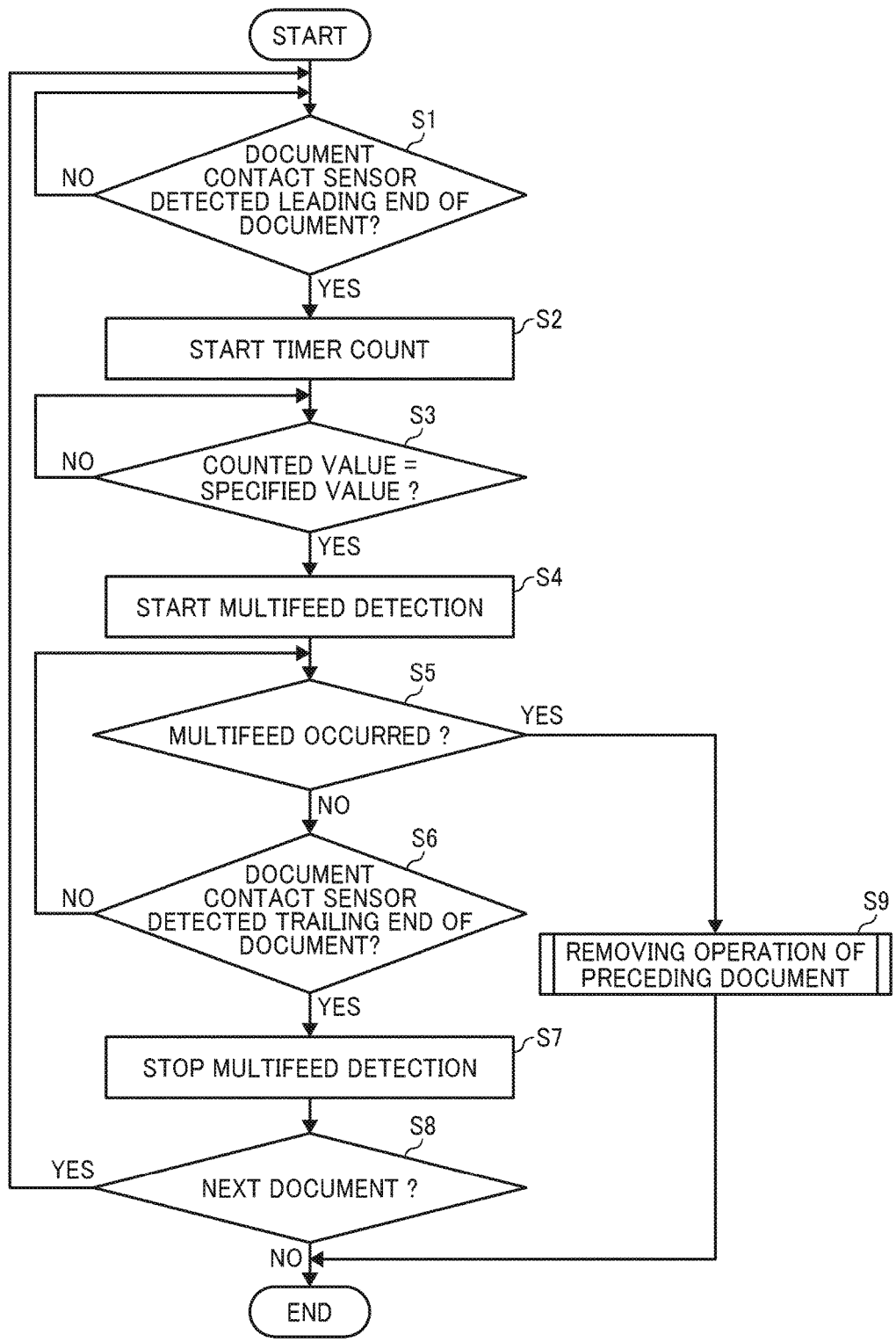
FIG. 9 is a flowchart of a process of multifeed occurrence detection control according to an embodiment of the present disclosure.

Next, a description is given of multifeed occurrence detection control in the present embodiment. FIG. 9 is a flowchart of a process of multifeed occurrence detection control in the present embodiment. In the present embodiment, when the controller 100 receives the document feed signal and the document MS on the document loading table 53 is sent out through the separation nip, the leading end of the document MS is detected with the contact sensor 72 (YES in S1). When the controller 100 receives the detection signal, the controller 100 starts counting the timer (S2). When the count value of the timer reaches a specified value (YES in S3), the controller 100 starts emission of an ultrasonic wave from the ultrasonic emitting element 531 of the multifeed detecting unit 530 to start the multifeed detecting operation (S4). As described above, the specified value is set so that the multifeed detecting operation is not performed when a leading end portion of the document MS is present at the multifeed detection point by a predetermined length (in this example, 25 mm) in the sheet feed direction from the leading end of the document MS. However, the specified value may be any other suitable value. By changing the setting of the specified value, it is adjustable from which position the multifeed detecting operation is to be started with respect to the document MS.

Then, the multifeed detecting operation is continued until the trailing end of the document MS is detected with the contact sensor 72. When the trailing end of the document MS is detected with the contact sensor 72 without detection of the multifeed (YES in S6), the emission of an ultrasonic wave from the ultrasonic emitting element 531 of the multifeed detecting unit 530 is stopped and the multifeed detecting operation is stopped (S7). If there is a next document MS (YES in S8), the controller 100 executes the multifeed detecting operation (S2 to S7) according to the timing when the leading end of the next document MS is detected with the contact sensor 72 (YES in S1).

At this time, the controller 100 may start counting of the timer when the trailing end of the document MS is detected with the contact sensor 72. When the count value of the timer reaches a specified value, the controller 100 may stop emission of the ultrasonic wave from the ultrasonic emitting element 531 of the multifeed detecting unit 530. In such a case, by changing the setting of the specified value, it is adjustable to which position the multifeed detecting operation is to be performed with respect to the document MS.

When the output signal level of the ultrasonic receiving element 532 is the L-level during the multifeed detecting operation, the multifeed detection signal indicating the occurrence of the multifeed is transmitted from the multifeed detecting unit 530 to the controller 100. Accordingly, the controller 100 determines that the multifeed has occurred (YES in S5) and executes preceding-document removing operation (S9), which is described below.

First Example of Preceding-document Removing Operation

Figure 10:
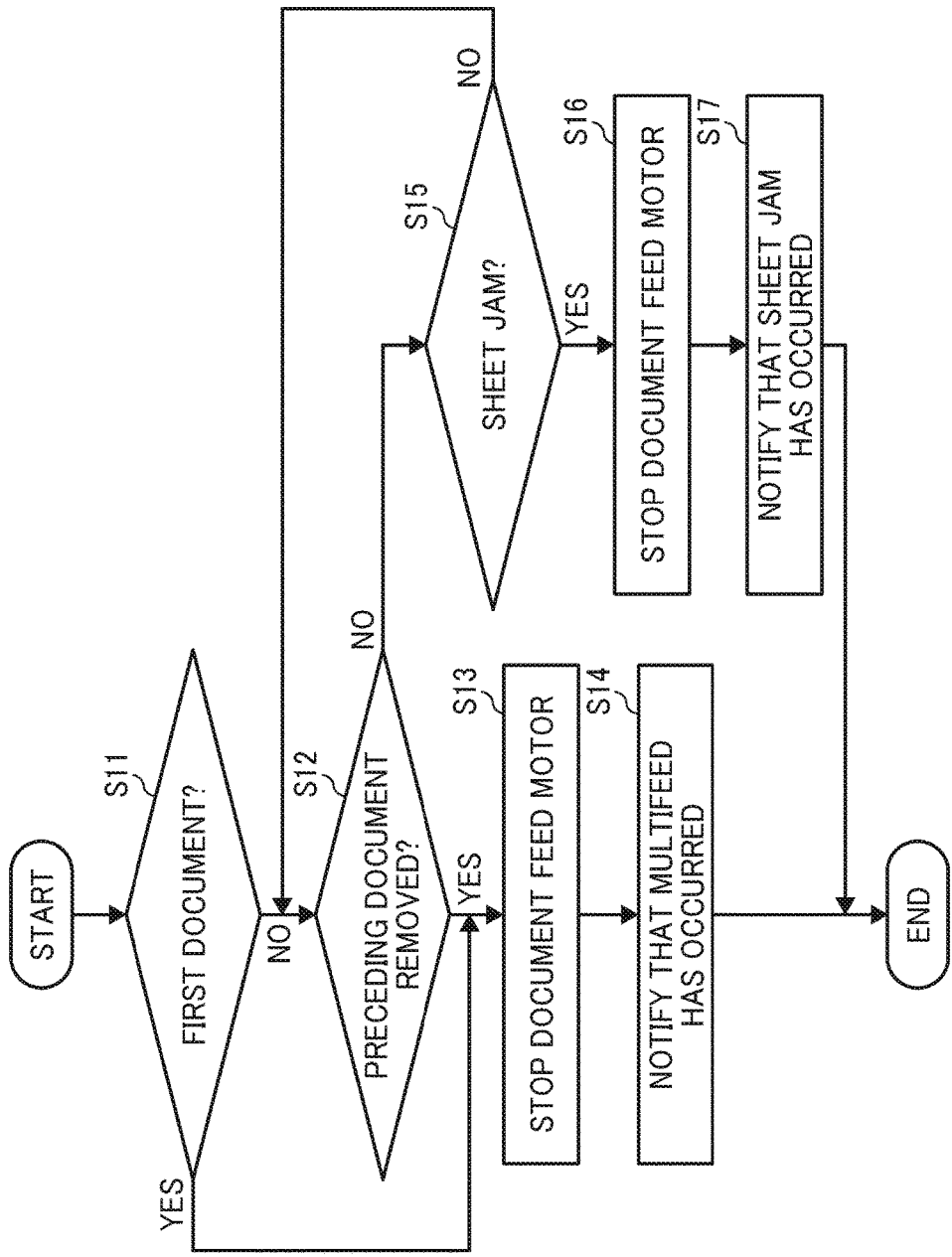
FIG. 10 is a flowchart of a process of a first example of preceding-document removing operation.

Next, a description is given of an example of the preceding-document removing operation (hereinafter, referred to as a first example of the preceding-document removing operation) to be executed when the multifeed has occurred. FIG. 10 is a flowchart of a process of the first example of the preceding-document removing operation. In the first example of the preceding-document removing operation, when the multifeed has occurred, first, the controller 100 determines whether the document MS in which the multifeed has occurred is a first document (S11). If the controller 100 determines that the document MS in which the multifeed has occurred is the first document (YES in S11), the controller 100 stops the driving of the document feed motor 102 immediately on detection of the occurrence of multiple feeding (S13) to stop driving of all of the conveyance drivers, such as the first paired conveying rollers 86, the second paired conveying rollers 90, the paired reading exit rollers 92, and the paired ejection rollers 93. Then, the controller 100 issues to the operation unit 108 a notice indicating that the multifeed has occurred (S14), and prompts a user to remove multifed documents MS and set the documents MS on the document loading table 53 again.

When the driving of all of the conveyance drivers is stopped immediately on detection of the occurrence of the multifeed, the conveyance of the multifed documents MS is stopped in a state in which the multifed documents MS pass the multifeed detection point of the multifeed detecting unit 530. In the present embodiment, two sheet detectors, that is, the contact sensor 72 and the registration sensor 65 are arranged across the multifeed detection point on the conveyance path of the document MS. The distance between the detection point of the contact sensor 72 and the detection point of the registration sensor 65 is set to be shorter than a length in the document conveyance direction of a document size having a shortest length in the document conveyance direction among the document sizes that can be conveyed by the ADF 51 in the present embodiment. As a result, the multifed document MS is stopped in a state of passing the detection point of any one of the contact sensor 72 and the registration sensor 65 regardless of which portion of the multifed document MS (even if near the leading end or the trailing end) is passing the multifeed detecting point of the multifeed detecting unit 530 when the multifed document MS is stopped. With such a configuration, the controller 100 can reliably determine, from a detection result of the contact sensor 72 or the registration sensor 65, whether the user who receives the notice of the occurrence of the multifeed has removed the multifed documents MS.

Figure 11:
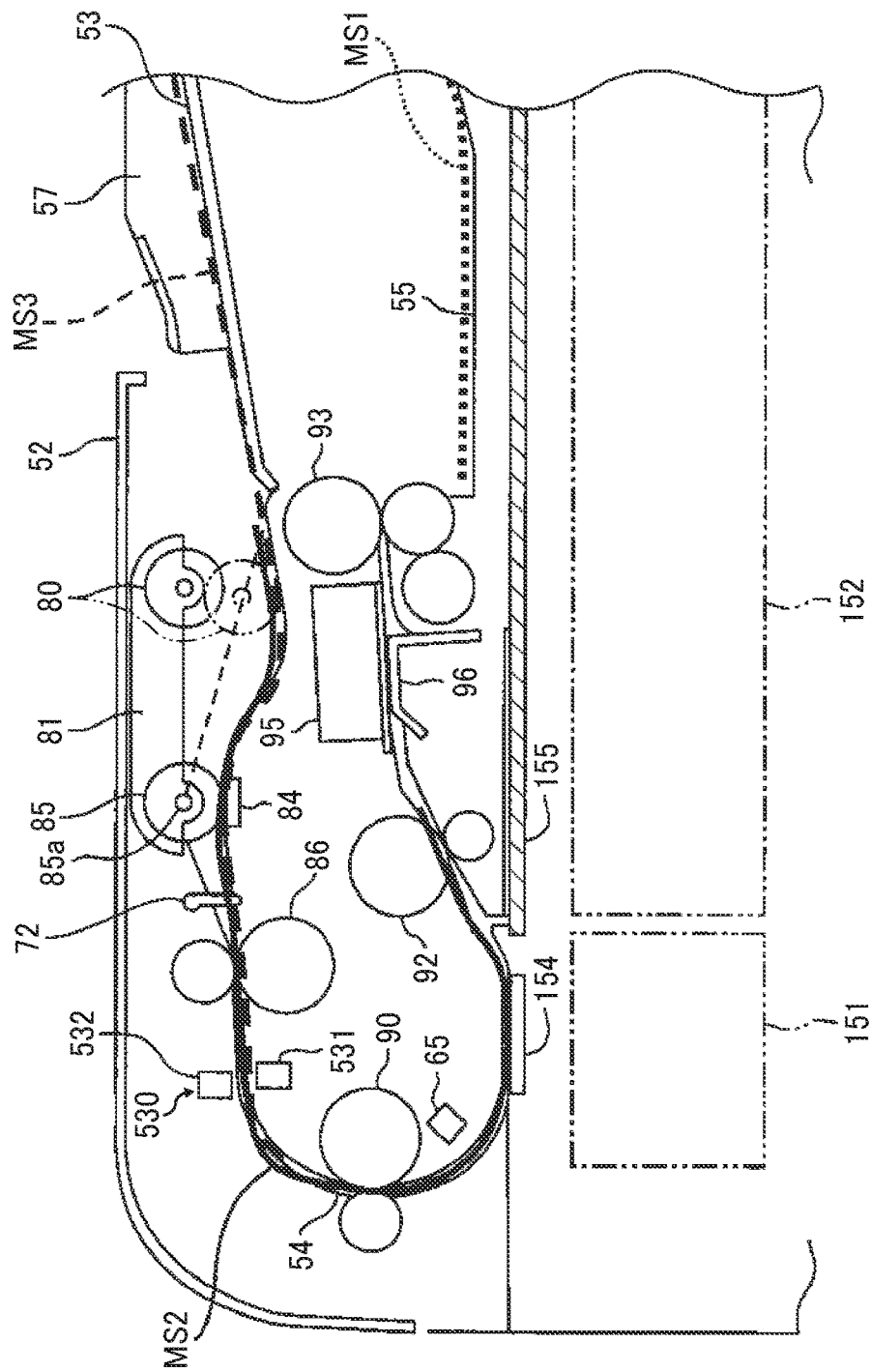
FIG. 11 is an illustration of a state in which multifeed has occurred has occurred on subsequent documents after a preceding sheet has been conveyed to a document stacking table.
Figure 12:
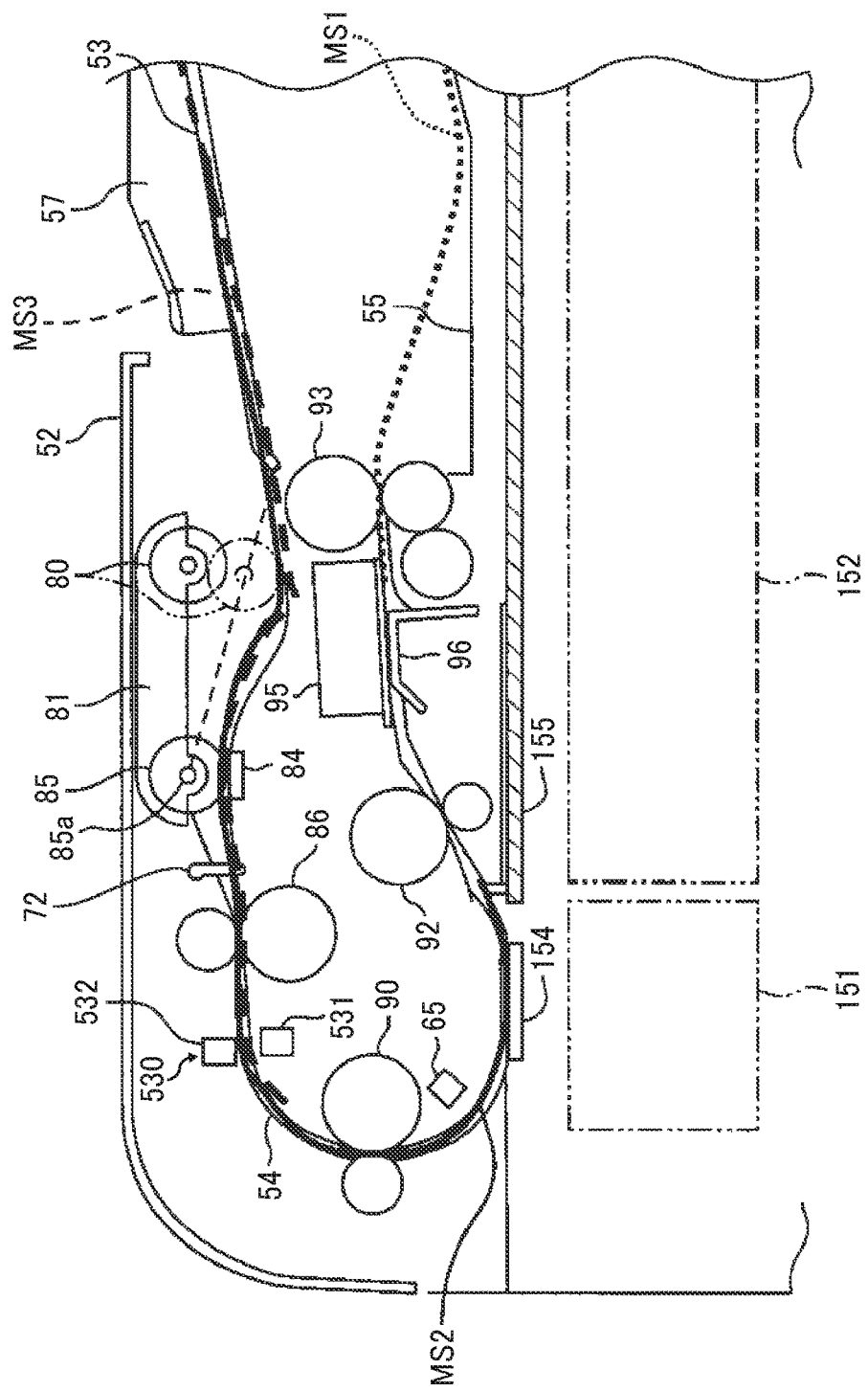
FIG. 12 is an illustration of a state in which multifeed has occurred in subsequent documents when image reading of a preceding sheet has been completed but the preceding sheet has not been conveyed to the document stacking table.
Figure 13:
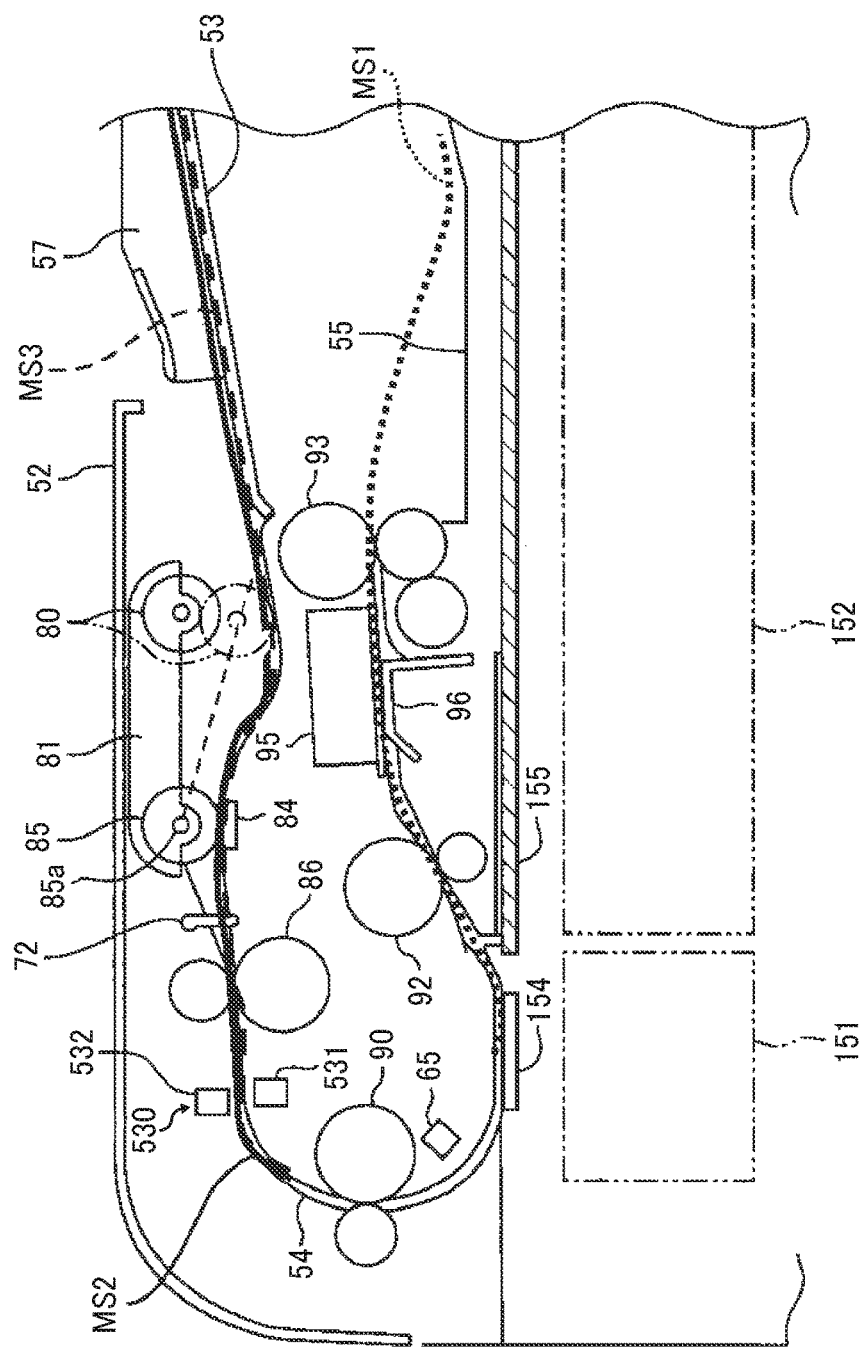
FIG. 13 is an illustration of a state in which multifeed has occurred in subsequent documents when image reading of a preceding sheet has not been completed.

On the other hand, when the document MS in which the multifeed has occurred is the second or subsequent document, the position of a preceding document MS, preceding the document on which the multifeed has occurred, on the conveyance path varies depending on the detection timing of the multifeed. For example, as illustrated in FIG. 11, after the preceding document MS1 is conveyed to the document stacking table 55 (the conveyance completion position), the occurrence of multifeed of the subsequent documents MS2 and MS3 may be detected. Further, as illustrated in FIG. 12, when the image reading of the preceding document MS1 is completed but the conveyance of the document MS to the document stacking table 55 (the conveyance completion position) is not completed, the occurrence of multifeed of the subsequent documents MS2 and MS3 may be detected. Further, as illustrated in FIG. 13, when the image reading of the preceding document MS1 is not completed, the occurrence of multifeed of the subsequent documents MS2 and MS3 may be detected. Therefore, if the driving of the document feed motor 102 is stopped immediately on detection of the occurrence of the multifeed when the document MS2, in which the multifeed has occurred, is the second or subsequent document, in the case of FIG. 12 or FIG. 13, the user cannot immediately grasp whether the image reading of the preceding document MS1 remaining in the conveyance path has been completed. It would be necessary for the user to check whether the image reading of the preceding document MS1 has been completed.

Hence, in the present embodiment, when the controller 100 determines that the document MS2 in which the multifeed has occurred is the second or subsequent document (NO in S11), the controller 100 continues driving of the document feed motor 102 until the preceding document MS1 is ejected to the document stacking table 55 (the conveyance completion position) (S12). At this time, the image reading operation is also continued. Accordingly, when the multifeed has occurred, the preceding document MS1 preceding the multifed document MS2 does not remain in the conveyance path and is ejected to the document stacking table 55. The user can immediately recognize that the image reading of the preceding document MS1 has been completed, and set the multifed documents MS2 and MS3 remaining in the conveyance path on the document loading table 53 again.

If a jam occurs during conveyance continued after the occurrence of multifeed (YES in S15), the driving of all of conveyance drivers is immediately stopped (S16), the controller 100 issues to the operating unit 108 a notice indicating that a jam has occurred (S17) to prompt the user to remove the jammed document.

Here, in the present embodiment, all of the conveyance drivers, such as the first paired conveying rollers 86, the second paired conveying rollers 90, the paired reading exit rollers 92, and the paired ejection rollers 93, are simultaneously driven. Accordingly, if the driving of the document feed motor 102 is continued until the preceding document MS1 is ejected to the document stacking table 55 after the occurrence of the multifeed, the conveyance of the multifed documents MS2 and MS3 together with the preceding sheet MS1 is continued. At a predetermined timing (YES in S12) after the preceding document MS1 is ejected to the document stacking table 55 (the conveyance completion position), the controller 100 stops the driving of the document feed motor 102 (S13). Thus, the controller 100 stops the driving of all of the conveyance drivers, such as the first paired conveying rollers 86, the second paired conveying rollers 90, the paired reading exit rollers 92, and the paired ejection rollers 93, and stops conveyance of the multifed documents MS2 and MS3. Note that, by turning the document feed clutch 101 OFF, the following documents subsequent to the multifed documents MS are controlled not to be conveyed.

At this time, depending on the setting of the drive stop timing of the document feed motor 102 after the preceding document MS1 is set to the document stacking table 55 (the conveyance completion position), the setting of the sheet interval, the setting of the inter-document interval, the arrangement of the detection points of the contact sensor 72 and the registration sensor 65 as the sheet detectors, the conveyance of the multifed documents MS2 and MS3 might be stopped at positions at which the multifed documents MS2 and MS3 do not pass the detection point of any of the sheet detectors.

Figure 14:
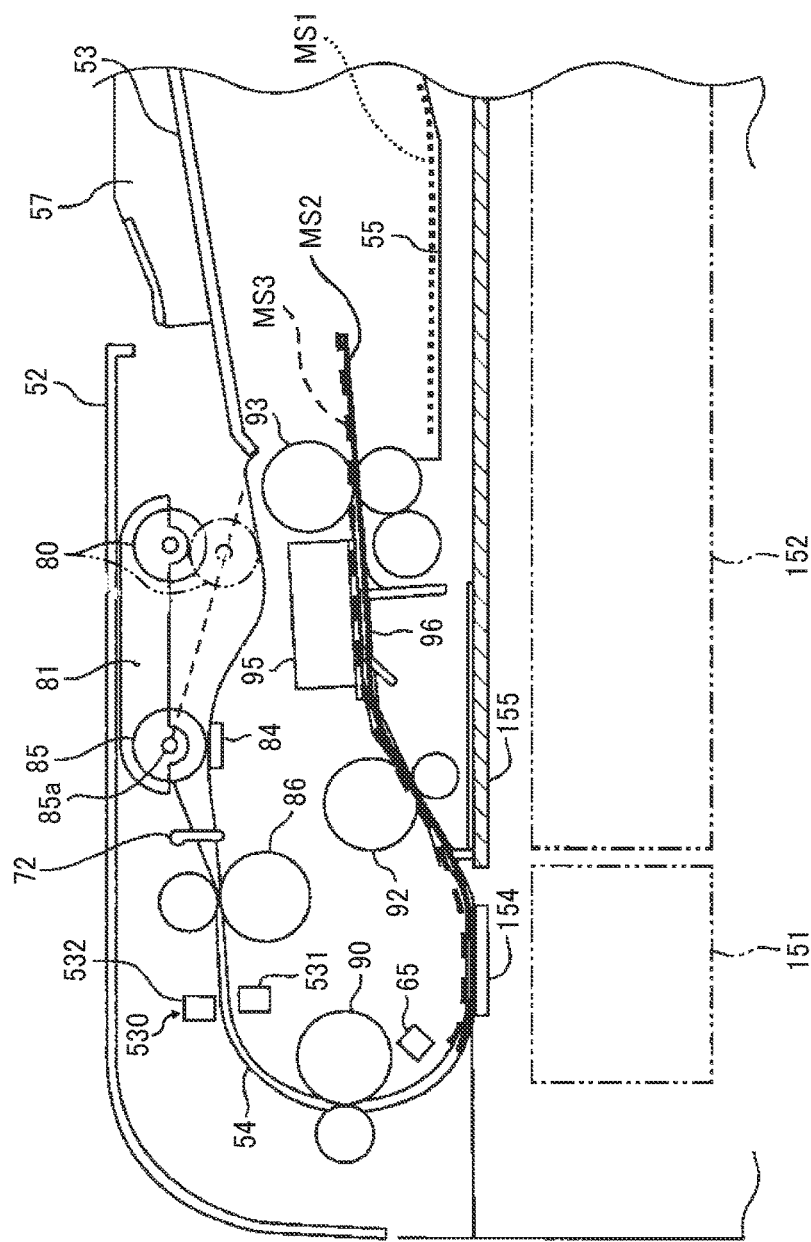
FIG. 14 is an illustration of an example of a state in which multifed documents do not pass any sheet detection point when conveyance of the multifed documents is stopped after a preceding sheet is ejected to a document stacking table.

For example, when the multifed documents MS2 and MS3 are stopped at the positions as illustrated in FIG. 14 after the preceding document MS1 is ejected to the document stacking table 55 (the conveyance completion position), the documents MS2 and MS3 do not pass the detection point of any of the sheet detectors. In such a case, the controller 100 cannot determine, from the detection result of any of the sheet detectors, whether the user receiving the notice of the occurrence of multifeed has removed the multifed document.

Hence, in the present embodiment, regardless of which part of the document MS passes the multifeed detection point of the multifeed detecting unit 530 on detection of the multifeed, the setting of drive stop timing of the document feed motor 102, the setting of the inter-sheet interval, and the arrangement of detection points of the sheet detectors in the conveyance path are set so that the multifed document MS passes the detection point of any of the sheet detectors (that is, the contact sensor 72 and the registration sensor 65) when the driving of the document feed motor 102 is stopped after the preceding document MS1 is ejected to the document stacking table 55 (the conveyance completion position).

In the example of FIG. 14, the detection point of the registration sensor 65 being the sheet detector located most downstream of the conveyance path is set to be disposed downstream, in the conveyance direction, from the position of a trailing end of the multifed document MS when the driving of the document feed motor 102 is stopped after the preceding document MS1 is ejected to the document stacking table 55 (the conveyance completion position). Accordingly, the controller 100 can reliably determine, from the detection result of the registration sensor 65, whether the user receiving the notice of the occurrence of the multifeed has removed the multifed documents MS. In such a case, the distance from the paired ejection rollers 93 to the detection point of the registration sensor 65, which is a sheet detector disposed on the most downstream side of the conveyance path in the conveyance direction, is set to be shorter than a sum of a smallest inter-sheet distance and a length of a document having a shortest size in the document conveyance direction among document sizes conveyable in the ADF 51.

Second Example of Preceding-document Removing Operation

Next, a description is given of another example of the preceding-document removing operation (hereinafter, referred to as a second example of the preceding-document removing operation) to be executed when a multifeed has occurred. Due to various circumstances, it may be difficult to set so that the multifed documents MS pass the detection point of one of the sheet detectors when the driving of the document feed motor 102 is stopped after the preceding document MS1 is ejected to the document stacking table 55 (the conveyance completion position). For the second example of the preceding-document removing operation, even if the multifed documents MS do not pass the detection point of one of the sheet detectors when the driving of the document feed motor 102 is stopped after the preceding document MS1 is ejected to the document stacking table 55 (the conveyance completion position), the following conveyance operation controls the multifed documents MS to pass the detection point of one of the sheet detectors.

Figure 15:
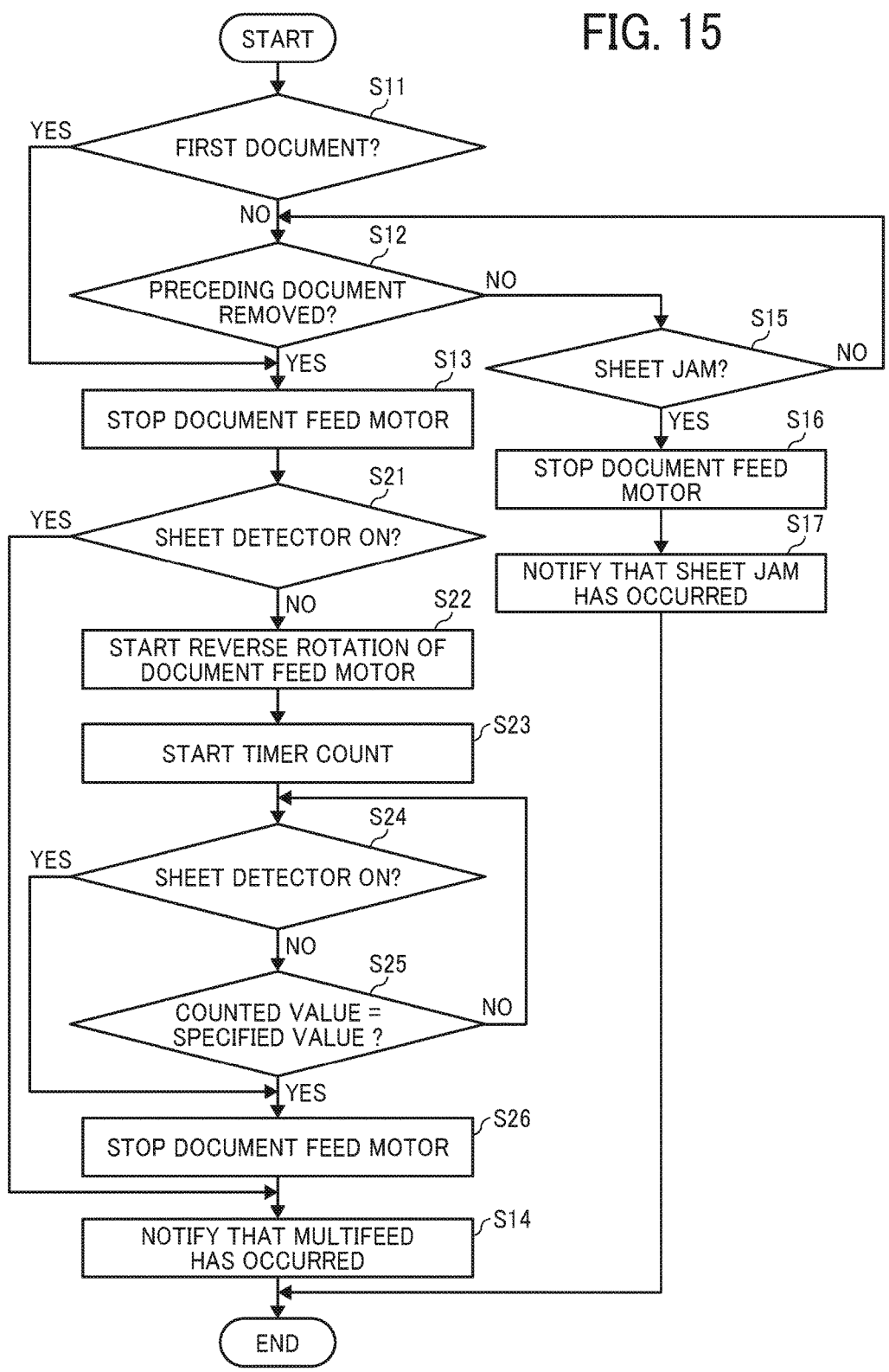
FIG. 15 is a flowchart of a process of a second example of the preceding-document removing operation.

FIG. 15 is a flowchart of a process of the second example of the preceding-document removing operation. In the second example of the preceding-document removing operation, when a multifeed occurs, first, the controller 100 determines whether the document MS in which the multifed has occurred is a first document (S11). If the controller 100 determines that the document MS in which the multifeed has occurred is the first document (YES in S11), the controller 100 stops the driving of the document feed motor 102 immediately on detection of the occurrence of multiple feeding (S13) to stop driving of all of the conveyance drivers, such as the first paired conveying rollers 86, the second paired conveying rollers 90, the paired reading exit rollers 92, and the paired ejection rollers 93. In such a case, the controller 100 confirms that the multifed document MS is detected with one of the contact sensor 72 and the registration sensor 65 as the sheet detectors (YES in S21). Then, the controller 100 issues to the operation unit 108 a notice indicating that the multifeed has occurred (S14), and prompts a user to remove multifed documents MS and set the documents MS on the document loading table 53 again.

Alternatively, when the controller 100 determines that the document MS2 in which the multifeed has occurred is the second or subsequent document (NO in S11), the controller 100 continues driving of the document feed motor 102 until the preceding document MS1 is ejected to the document stacking table 55 (the conveyance completion position) (S12). At this time, the image reading operation is also continued. Accordingly, when the multifeed has occurred, the preceding document MS1 preceding the multifed document MS2 does not remain in the conveyance path and is ejected to the document stacking table 55. The user can immediately recognize that the image reading of the preceding document MS1 has been completed, and set the multifed documents MS2 and MS3 remaining in the conveyance path on the document loading table 53 again. If a jam occurs during conveyance continued after the occurrence of multifeed (YES in S15), the driving of all of conveyance drivers is immediately stopped (S16), the controller 100 issues to the operating unit 108 a notice indicating that a jam has occurred (S17) to prompt the user to remove the jammed document.

At a predetermined timing (YES in S12) after the preceding document MS1 is ejected to the document stacking table 55 (the conveyance completion position), the controller 100 stops the driving of the document feed motor 102 (S13). Thus, the controller 100 stops the driving of all of the conveyance drivers, such as the first paired conveying rollers 86, the second paired conveying rollers 90, the paired reading exit rollers 92, and the paired ejection rollers 93, and stops conveyance of the multifed documents MS2 and MS3. At this time, if the multifed document MS is detected with one of the contact sensor 72 and the registration sensor 65 as the sheet detectors (YES in S21), the controller 100 issues to the operation unit 108 a notice indicating that the multifeed has occurred (S14), and prompts a user to remove multifed documents MS and set the documents MS on the document loading table 53 again.

If the multifed document MS is not detected with any of the contact sensor 72 and the registration sensor 65 as the sheet detectors (No in S21), the controller 100 controls the reverse rotation drive of the document feed motor 102 (S22) and starts to count the timer (S23). Accordingly, the multifed document MS is conveyed in the reverse direction in the conveyance path. When the multifed document MS is detected with one of the contact sensor 72 and the registration sensor 65 as the sheet detectors (YES in S24), the controller 100 stops the driving of the document feed motor 102 (S26), and stops the driving of all of the conveyance drivers, such the first paired conveying rollers 86, the second paired conveying rollers 90, the paired reading exit rollers 92, and the paired ejection rollers 93. Then, the controller 100 issues to the operation unit 108 a notice indicating that the multifeed has occurred (S14), and prompts a user to remove multifed documents MS and set the documents MS on the document loading table 53 again.

When the multifed document MS is not detected with any of the contact sensor 72 and the registration sensor 65 as the sheet detectors (NO in S25) even if the count value of the timer has reached the specified value, the controller 100 stops the driving of the document feed motor 102 (S26), and stops the driving of all of the conveyance drivers, such the first paired conveying rollers 86, the second paired conveying rollers 90, the paired reading exit rollers 92, and the paired ejection rollers 93. Then, the controller 100 issues to the operation unit 108 a notice indicating that the multifeed has occurred (S14), and prompts a user to remove multifed documents MS and set the documents MS on the document loading table 53 again.

With such a configuration, for example, even when the multifed documents MS2 and MS3 are stopped at the positions illustrated in FIG. 14 after the preceding document MS1 is ejected to the document stacking table 55 (the conveyance completion position), the multifed documents MS2 and MS3 can be conveyed in the reverse direction until the multifed documents MS2 and MS3 pass the detection point of the registration sensor 65. Such a configuration can prevent a situation in which the controller 100 cannot determine whether a user receiving the notice that the multifeed has occurred has removed the multifed documents MS. When the document MS is conveyed in the reverse direction as in the second example of the preceding-document removing operation, it is preferable to take into consideration the shape of the guide or the like constituting the conveyance path so that the document MS does not get caught even if the document MS is conveyed in the reverse direction.

Note that, in the second example of the preceding-document removing operation, when the multifed documents MS are not detected with any of the contact sensor 72 and the registration sensor 65 as the sheet detectors, the document feed motor 102 is driven in the reverse direction. However, the document feed motor 102 may be driven in the forward direction, depending on the relative positions of the conveyance stop positions of the multifed documents MS and the detection points of the sheet detectors.

The above-described embodiments are only examples and, for example, in the following aspects A to M of the present disclosure, advantages described below can be obtained.

Aspect A

A sheet conveying device, such as the ADF 51, includes a sheet container, such as the document loading table 53, to load sheets, such as documents MS; a separation feeder, such as the pickup roller 80, the separation pad 84, and the feed roller 85, to separate and feed a sheet from the sheets on the sheet container; a plurality of conveyance drivers, such as the first paired conveying rollers 86, the second paired conveying rollers 90, the paired reading exit rollers 92, and the paired ejection rollers 93, driven together to convey the sheet to a conveyance completion position, such as the document stacking table 55, on a sheet conveyance path; a multifeed detector, such as the multifeed detecting unit 530, to detect occurrence of a multifeed on the sheet conveyance path; a sheet detector, such as the contact sensor 72 and the registration sensor 65, to detect presence or absence of the sheet at a sheet detection point on the sheet conveyance path; and a conveyance controller, such as the controller 100, to control the plurality of conveyance drivers to be continuously driven until a preceding sheet preceding multifed sheets is conveyed to the conveyance completion position after the multifeed detector detects the occurrence of the multifeed, and to control the plurality of conveyance drivers to stop in a period in which at least one of the multifed sheets is present at the sheet detection point after the preceding sheet is conveyed to the conveyance completion position. According to the present aspect, after the multifeed detector detects the occurrence of a multifeed and a preceding sheet preceding multifed sheets is conveyed to the conveyance completion position, the driving of the plurality of conveyance drivers simultaneously driven stops in a period in which at least one of the multifed sheets is present at the sheet detection point. Accordingly, even if the multifed sheets and the preceding sheet cannot be separately conveyed, such a configuration can prevent a situation in which the multifed sheets remain on the sheet conveyance path outside the sheet detection point of the sheet detector while the preceding sheet is conveyed to the conveyance completion position. Thus, such a configuration can prevent occurrence of a situation in which a sheet jam occurs due to resumption of conveyance of the sheet in a state in which the multifed sheet remains on the sheet conveyance path without being properly removed by a user.

Aspect B

In the above-described aspect A, when the preceding sheet is not present (for example, a multifeed has occurred on a first document) or is already conveyed to the conveyance completion position on detection of the occurrence of the multifeed with the multifeed detector, the conveyance controller controls the plurality of conveyance drivers to stop at an earliest time in the period in which the at least one of the multifed sheets is present at the sheet detection point. Such a configuration can reduce the possibility of damage caused by continued conveyance of the multifed documents.

Aspect C

In the above-described aspect B, the sheet detector detects presence or absence of the sheet at a plurality of sheet detection points that includes at least one sheet detection point at each of an upstream side and a downstream side of a multifeed detection point, at which the multifeed detector detects the occurrence of the multifeed, in a sheet conveyance direction. A distance between adjacent two sheet detection points across the multifeed detection point on the sheet conveyance path is shorter than a length of a shortest sheet in the sheet conveyance direction. The shortest sheet has a shortest length in the sheet conveyance direction among sheets conveyable in the sheet conveying device. With such a configuration, even when the driving of the conveyance drivers is stopped immediately on detection of the occurrence of the multifeed with the multifeed detector, at that time, at leas one of the multifed sheets is stopped at any one of the plurality of sheet detection points. Accordingly, such a configuration can obviate the control of driving the plurality of conveyance drivers so that at least one of the multifed sheets is present at any one of the sheet detection points after the driving is stopped, thus allowing a reduction of damage caused by continued conveyance of the multifed documents.

Aspect D

In any of the above-described aspects A to C, after the multifeed detector detects the occurrence of the multifeed and the preceding sheet is conveyed to the conveyance completion position, the conveyance controller controls the plurality of conveyance drivers to be driven in reverse to convey the multifed sheets in a reverse direction and stop in the period in which the at least one of the multifed sheets is present at the sheet detection point. When the plurality of conveyance drivers simultaneously driven is stopped after the preceding sheet is conveyed to the conveyance completion position, due to various circumstances, it may be difficult to set so that the multifed documents pass the detection point of any one of the sheet detectors regardless of the types of multifeed patterns. According to the present aspect, even if there is a multifeed pattern in which multifed documents MS do not pass the detection point of any one of the sheet detectors when the plurality of conveyance drivers simultaneously driven is stopped after the preceding sheet is conveyed to the conveyance completion position, conveying the multifed documents in the reverse direction allows the multifed documents to be stopped at a position at which the multifed documents pass the detection point of any one of the sheet detectors. Accordingly, even when there are various circumstances as described above, such a configuration can prevent a situation in which the multifed sheet remains on the sheet conveyance path outside the sheet detection points of the sheet detectors.

Aspect E

In the above-described aspect D, the conveyance controller controls the plurality of conveyance drivers to stop when the sheet detector detects no sheet within a threshold period from a start of conveyance of the multifed sheets in the reverse direction. According to the present aspect, the situation can be prevented in which the driving of the plurality of conveyance drivers is endlessly continued even if multifed documents are not properly conveyed in the reverse direction.

Aspect F

A sheet conveying device, such as the ADF 51, includes a sheet container, such as the document loading table 53, to load sheets, such as documents MS; a separation feeder, such as the pickup roller 80, the separation pad 84, and the feed roller 85, to separate and feed a sheet from the sheets on the sheet container to a sheet conveyance path; a multifeed detector, such as the multifeed detecting unit 530, to detect occurrence of a multifeed on the sheet conveyance path; a sheet detector, such as the contact sensor 72 and the registration sensor 65, to detect presence or absence of the sheet at a sheet detection point on the sheet conveyance path; and a multifeed detection controller, such as the controller 100, to determine a multifeed detection period of the sheet according to a length of the sheet in a sheet conveyance direction obtained from a detection result of the sheet detector and control the multifeed detector to detect the occurrence of the multifeed in the multifeed detection period. In a sheet conveying device, such as a sheet feeding device, typically, the multifeed detection period is constant for any type of sheets having different lengths in the conveyance direction. Accordingly, for a plurality of types of sheets having different lengths in the conveyance direction, for example, such a typical sheet conveying device may not perform multifeed detecting operation for a sheet portion excluding only the leading end portion and the trailing end portion of the sheet. According to the present aspect, multifeed detection operation can be performed on an appropriate range of each of the plurality of types of sheets having different lengths in the conveyance direction. Therefore, the multifeed detecting operation can also performed on, for example, a sheet portion excluding only the leading end portion and the trailing end portion of the sheet.

Aspect G

In the above-described aspect F, the sheet detector detects presence or absence of the sheet at an upstream sheet detection point upstream of a multifeed detection point, at which the multifeed detector detects the occurrence of the multifeed, in the sheet conveyance direction. The multifeed detection controller determines the multifeed detection period of the sheet according to a length of the sheet in the sheet conveyance direction, which is obtained from a detection result at the upstream sheet detection point. According to the present aspect, a start position on the sheet, at which the multifeed detection operation starts, can be grasped before the start position on the sheet enters the multifeed detection point, and an end position of the sheet, at which the multifeed detection operation ends, can be grasped before the end position enters the multifeed detection point. Such a configuration can perform the multifeed detecting operation in a minimum range.

Aspect H

In the above-described aspect G, the multifeed detection controller determines a start time of the multifeed detection period from a detection result of a leading end of the sheet at the upstream sheet detection point and an end time of the multifeed detection period from a detection result of a trailing end of the sheet at the upstream sheet detection point. According to the present aspect, the upstream sheet detection point can be positioned immediately before the multifeed detection point (at a position adjacent to the upstream side in the sheet conveyance direction).

Aspect I

In the above-described aspect H, the multifeed detection controller determines the start time of the multifeed detection period from a detection time of the leading end of the sheet at the upstream sheet detection point and a sheet conveyance speed and the end time of the multifeed detection period from a detection time of the trailing end of the sheet at the upstream sheet detection point and the sheet conveyance speed. According to the present aspect, the start time and the end time of the multifeed detection period can be properly determined.

Aspect J

In any one of the aspects F to I, the multifeed detection controller determines the multifeed detection period so as not to include a period in which at least one of a leading end portion of the sheet having a predetermined length in the sheet conveyance direction from the leading end of the sheet and a trailing end portion of the sheet having a predetermined length in the sheet conveyance direction from the trailing end of the sheet is present at the multifeed detection point. According to the present aspect, for any type of sheets having different lengths in the conveyance direction, the erroneous detection of multifeed due to the fluttering or deformation of the leading or trailing end of the sheet can be reduced.

Aspect K

An image reading device, such as the image reading unit 50, includes the sheet conveying device, such as the ADF 51, according to any aspect of the above-described aspects A to J to convey the sheet, such as the document MS, and an image reader, such as the scanner 150, to read an image on the sheet conveyed by the sheet conveying device. According to the present aspect, even if the multifed sheets and the preceding sheet cannot be separately conveyed, a situation can be prevented in which the multifed sheets remain on the sheet conveyance path outside the sheet detection point of the sheet detector while the preceding sheet is conveyed to the conveyance completion position.

Aspect L

In the above-described aspect K, the image reader starts or finishes reading of the image on the sheet according to a detection time of the sheet detector, or starts and finishes reading of the image on the sheet according to a detection time of the sheet detector. According to the present aspect, by using the sheet detector used to determine the start time and the end time of image reading with the image reader, a situation can be prevented in which the multifed sheets remain on the sheet conveyance path outside the sheet detection points of the sheet detectors.

Aspect M

An image forming apparatus, such as the image forming apparatus 500, includes the image reading device, such as the image reading unit 50, and an image forming device, such as the image forming unit 1, to form an image according to the image read with the image reading device. According to the present aspect, even if the multifed sheets and the preceding sheet cannot be separately conveyed, a situation can be prevented in which the multifed sheets remain on the sheet conveyance path outside the sheet detection point of the sheet detector while the preceding sheet is conveyed to the conveyance completion position.

The above-described embodiments are illustrative and are not intended to limit the present disclosure. Thus, numerous additional modifications and variations are possible in light of the above teachings. For example, elements and/or features of different illustrative embodiments may be combined with each other and/or substituted for each other within the scope of the present invention.

What is claimed is:
1. A sheet conveying device comprising:
a sheet container to load sheets;
a separation feeder to separate and feed a sheet from the sheets on the sheet container;

a plurality of conveyance drivers driven together to convey the sheet to a conveyance completion position on a sheet conveyance path;

a multifeed detector to detect occurrence of a multifeed on the sheet conveyance path;

a sheet detector to detect presence or absence of the sheet at a sheet detection point on the sheet conveyance path; and a conveyance controller to control the plurality of conveyance drivers to be continuously driven for a predetermined timing until a preceding sheet preceding multifed sheets is conveyed to the conveyance completion position after the multifeed detector detects the occurrence of the multifeed, and to control the plurality of conveyance drivers to stop in a period in which at least one of the multifed sheets is present at the sheet detection point after the preceding sheet is conveyed to the conveyance completion position, wherein, after the multifeed detector detects the occurrence of the multifeed and the preceding sheet is conveyed to the conveyance completion position, the conveyance controller controls the plurality of conveyance drivers to be driven in reverse to convey the multifed sheets in a reverse direction and stop in the period in which the at least one of the multifed sheets is present at the sheet detection point.

2. The sheet conveying device according to claim 1, wherein the sheet detector detects presence or absence of the sheet at a plurality of sheet detection points that includes at least one sheet detection point at each of an upstream side and a downstream side of a multifeed detection point, at which the multifeed detector detects the occurrence of the multifeed, in a sheet conveyance direction, and wherein a distance between adjacent two sheet detection points across the multifeed detection point on the sheet conveyance path is shorter than a length of a shortest sheet in the sheet conveyance direction, the shortest sheet having a shortest length in the sheet conveyance direction among sheets conveyable in the sheet conveying device.

3. The sheet conveying device according to claim 1, wherein the conveyance controller controls the plurality of conveyance drivers to stop when the sheet detector detects no sheet within a threshold period from a start of conveyance of the multifed sheets in the reverse direction.

4. An image reading device comprising:

the sheet conveying device according to claim 1 to convey the sheet; and an image reader to read an image on the sheet conveyed by the sheet conveying device.

5. The image reading device according to claim 4, wherein the image reader performs at least one of start operation and end operation of reading of the image on the sheet according to a detection time of the sheet detector.

6. An image forming apparatus comprising:

the image reading device according to claim 4; and an image forming device to form an image according to the image read with the image reading device.

* * * * *